United States Patent
Khalid

(10) Patent No.: US 12,199,688 B2
(45) Date of Patent: Jan. 14, 2025

(54) SMART RADIO FREQUENCY PENETRATION LOSSES ASSESSMENT FOR DIGITAL CLUTTER

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 338 days.

(21) Appl. No.: 17/576,896

(22) Filed: Jan. 14, 2022

(65) Prior Publication Data
US 2023/0231639 A1    Jul. 20, 2023

(51) Int. Cl.
| | | |
|---|---|---|
| H04B 17/20 | (2015.01) | |
| H04B 17/309 | (2015.01) | |
| H04B 17/391 | (2015.01) | |
| H04W 16/18 | (2009.01) | |
| H04W 24/10 | (2009.01) | |

(52) U.S. Cl.
CPC ......... H04B 17/391 (2015.01); H04W 16/18 (2013.01); H04W 24/10 (2013.01)

(58) Field of Classification Search
None
See application file for complete search history.

(56) References Cited

U.S. PATENT DOCUMENTS

| | | | |
|---|---|---|---|
| 11,711,701 B2* | 7/2023 | Yang | H04L 5/0094 |
| | | | 370/252 |
| 11,968,554 B1* | 4/2024 | Marupaduga | H04W 24/08 |
| 2020/0229106 A1* | 7/2020 | Nguyen | H04W 52/245 |
| 2022/0338128 A1* | 10/2022 | Lee | H04W 52/283 |
| 2023/0095424 A1* | 3/2023 | Gurney | H04L 25/0202 |
| | | | 370/252 |
| 2023/0199676 A1* | 6/2023 | Palle Venkata | H04W 76/19 |

* cited by examiner

*Primary Examiner* — Ajit Patel
(74) *Attorney, Agent, or Firm* — Straub & Straub; Michael P. Straub; Stephen T. Straub

(57) ABSTRACT

Methods and apparatus for determining losses due to obstructions in a wireless communications system are described. Pairs of measurements points, one of each side of an obstruction are selected, and wireless device reported received signal energy measurements corresponding to the pair of selected locations are used to determine a path loss through the obstruction. In some embodiments, the pair of measurements points are selected based on one or more of: wireless device orientation at the time of measurement, application in use at the time of measurement, time between measurements, or location between measurements. In one example, a first selected location in the pair corresponds to an outdoor location with a unobstructed line of sight view to the base station, while the second selected location corresponds to an indoor location.

20 Claims, 20 Drawing Sheets

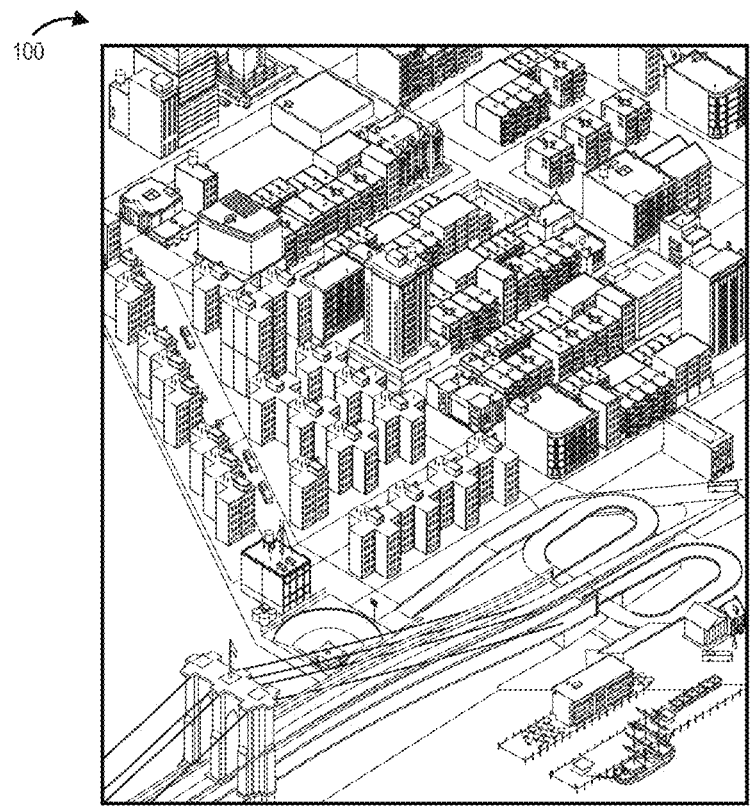
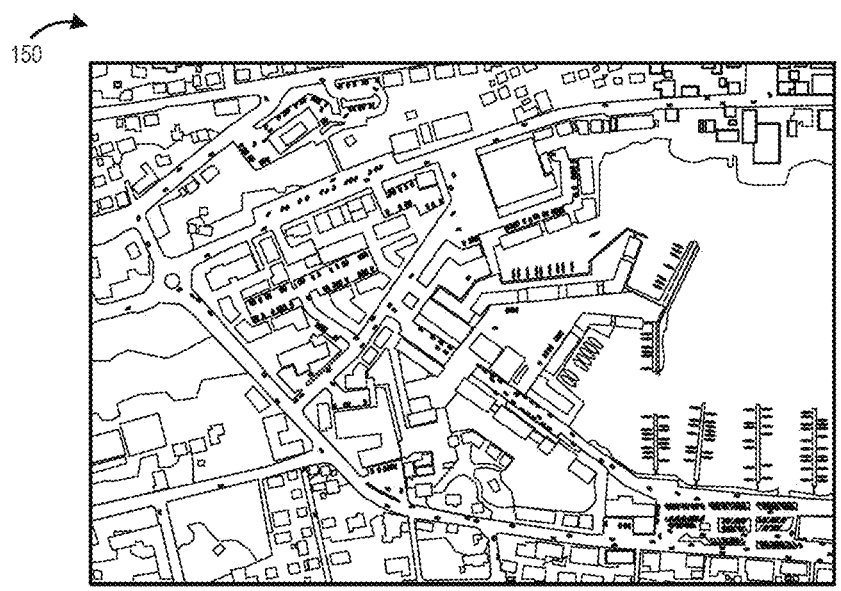
FIGURE 1

SMART RADIO FREQUENCY PENETRATION LOSSES ASSESSMENT FOR DIGITAL CLUTTER

FIELD

The present application relates to wireless communications and, more particularly, to methods and apparatus for assessing radio frequency penetration losses for digital clutter.

BACKGROUND

Radio Frequency (RF) designs, planning and propagation related exercises such as Net Present Value (NPV) assessments, etc. all have to use some form of clutter. Clutter is a digital representation of structures, objects, trees, etc. on the surface of the earth. Currently, these maps (clutter maps) are created using satellite imagery, airplane scans and even vehicles driven in the area for collection of data which is digitized for use. FIG. 1 illustrates an exemplary airplane scan 100 and an exemplary satellite image 150 which may be used to create digital clutter maps. This digitized data is then classified using a database of urban planning. i.e., what kind of a building a clutter represents. For example, various classes have been defined such as urban, urban high rise, urban residential, suburban, residential, industrial, rural, buildings, etc. This classification is helpful in calculating RF propagation i.e., by associating the environment to the propagation model. For example, urban, suburban, etc. propagation models are tuned for various types of environments and clutter classes.

A classic problem that has been persistent over time is how to associate and even find propagation losses of these different clutter types. This is difficult to assess as the clutter within the building also affects propagation.

Typically, survey teams are sent out to perform precise measurements within the communications environment. However, this approach can be very expensive in terms of the manpower required and can only provide a relatively small sample of the full environment. In addition, the environment is typically changing rapidly over time, e.g., as new construction occurs, as the interiors of buildings change due to remodeling, as trees are removed, as infrastructure changes, etc.

Based on the above there is a need for new methods and apparatus to determine losses due to clutter, e.g., obstructions, in a wireless communications environment and/or update loss models rapidly. It would be beneficial if at least some of these new methods and apparatus were automated and/or were able to utilize existing information.

SUMMARY

A mechanism to find propagation losses for various frequency bands using user equipment (UE) devices of subscribers is described. This approach can be advantageously used by cellular providers who have or are deploying network equipment in areas where clutter exists.

Methods and apparatus for determining losses due to obstructions in a wireless communications system are described. A database of reported received signal energy measurements from wireless devices is collected and stored, e.g., as part of ongoing wireless communication operations of a service provider. This collected data, including signal strength and/or energy measurements reported as part of normal wireless communications device operations is available to be subsequently utilized to determine losses through obstructions, e.g., walls, buildings, etc. The loss information can and sometimes is then used when making automated network equipment deployment decisions, e.g., where to locate a base station and/or for determining locations of devices, e.g., cell phones, based on received signal energy measurements.

In accordance with one feature, pairs of measurements points, one of each side of an obstruction are selected, and wireless device reported received signal energy measurements corresponding to the pair of selected locations are used to determine a path loss through the obstruction. In some embodiments, the pair of measurements points are selected based on one or more of: wireless device orientation at the time of measurement, application in use at the time of measurement, time between measurements, and/or distances between measurements. In one example, a first selected location in the pair corresponds to an outdoor location with an unobstructed line of sight view to the base station, while the second selected location corresponds to an indoor location. The selected location with the unobstructed line of sight view to the base station is useful to determine a baseline reference amount of loss through the air since the path is unobstructed. Depending on the implementation various factors are taken into consideration when selecting a pair of measurement locations for purposes of loss detection e.g., that: i) the pair of selected measurement locations are close to one another, e.g. as close spatially as possible, ii) the pair of selected measurements occurred close in time, e.g., as close temporally as possible, and/or iii) that the wireless device was in approximately the same orientation during the pair of measurements. In some embodiments the pair selection process favors selecting pairs which satisfy some of these criteria or a combination of these criteria. In some embodiments, device orientation is determined, e.g., predicated, based on the application type being used during the measurement time, e.g., vertical orientation is associated with voice application, horizontal orientation is associated with text application, and a tilted orientation is associated with video application. Wireless device orientation can also be determined based on matching a detected antenna information, e.g., a detected antenna pattern, to baseline antenna information.

In some embodiments, where possible, multiple selected pairs of measurements are used from the same and/or different wireless device, to determine the loss through an obstruction, e.g., a wall.

An exemplary method of determining signal loss due to one or more obstructions, in accordance with some embodiments, comprises: storing signal obstruction information, said signal obstruction information including the position of a first obstruction; storing wireless device received signal information corresponding to a first transmitter and a plurality of wireless devices, said received signal information including received signal energy information reported by at least a first wireless device for a plurality of locations; selecting a first pair of reported received signal energy measurements corresponding to the first wireless device, the first pair of reported received signal energy measurement including a first signal energy measurement corresponding to a first side of said first obstruction and a second signal energy measurement corresponding to a second side of said first obstruction, said first side of said first obstruction being closer to said first transmitter than said second side of said first obstruction; and determining a first path loss due to the first obstruction from said first signal measurement and said second signal energy measurements.

All of the features discussed in the above summary are not included in all embodiments and it should be appreciated that various embodiments include different combinations of features.

Numerous features and variations on the above described methods and apparatus are possible. Various embodiments, features and variations are described in more detail in the detailed description which follows.

The detailed description which follows describes additional features, details and embodiments which can be used alone or in combination.

BRIEF DESCRIPTION OF THE FIGURES

FIG. 1 illustrates an exemplary airplane scan and an exemplary satellite image which may be used to create digital clutter maps.

DETAILED DESCRIPTION

Figure 2:
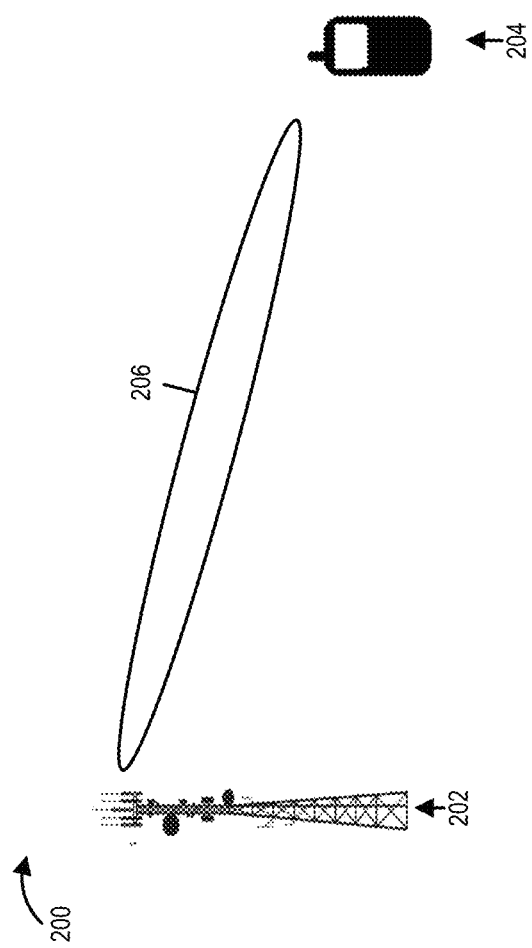
FIG. 2 is a drawing which shows typical cellular communication between a cellular tower, e.g., a base station, and a user equipment (UE).

FIG. 2 is a drawing 200 which shows typical cellular communication 206 between a cellular tower 202, e.g., a base station, and a user equipment (UE) 204. Cellular towers typically transmit to the UEs, which are being served, during the majority of the time of operation. Transmission may be, and sometimes is, over different bands, and this can be, and in some embodiments is, leveraged to calculate and/or assess the propagation loss and the clutter type of a building.

The idea that will be leveraged is the fact that UEs are a great source of measurements reporting i.e., Reference Signal Received Power (RSRP), Reference Signal Received Quality (RSRQ) and Signal to Interference & Noise Ratio (SINR), etc. reports are typically transmitted from a UE to a base station. UEs are moving sources i.e., moving from one building to another, and many of the UE's locations are repetitive and therefore multiple samples can be, and in some embodiments are, collected for the same or similar location. Multiple samples would typically result in improved and refined data. Radio Resource Control (RRC) Measurement reports are used to collect data in some embodiments.

Figure 3:
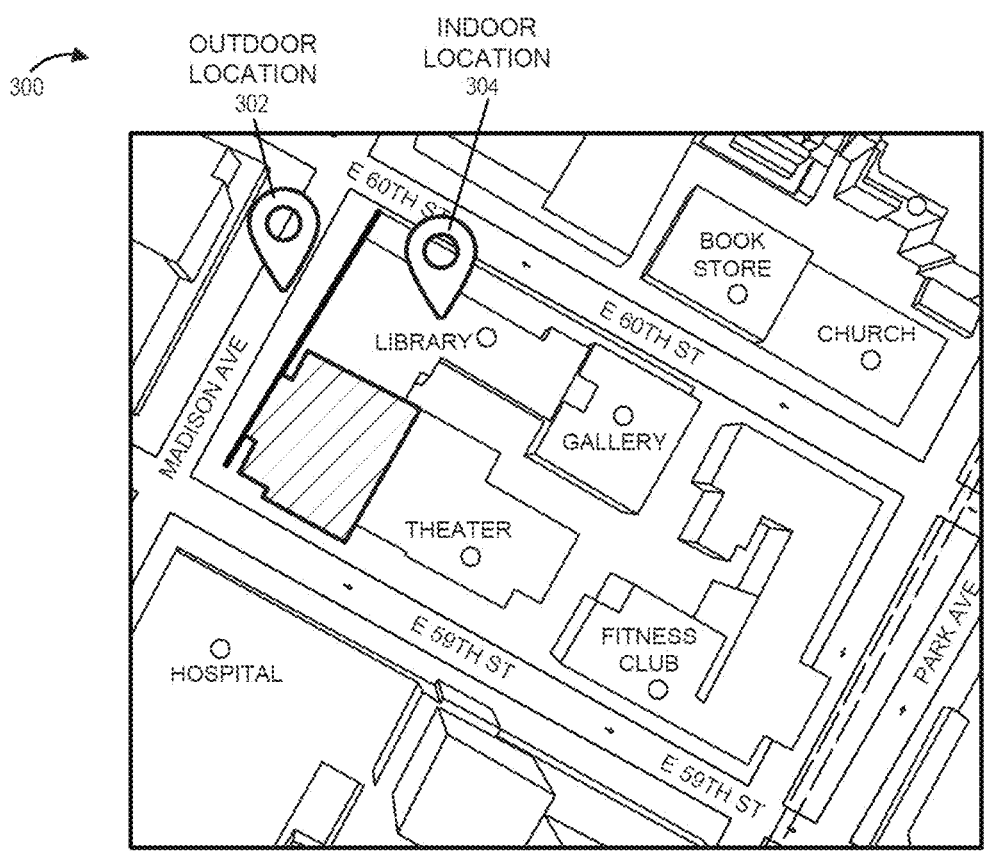
FIG. 3 is a drawing which illustrates typical location mapping of an exemplary UE which is being tracked including a first marking at an outdoor location and a second marking at an indoor location.

Consider an example in which a UE is initially on the street and then is moving inside a building; this scenario provides an opportunity to assess the losses of the wall of the building. This is possible because of accurate UE location reporting in addition to the reference signal reporting. UEs can be, and sometimes are, typically tracked with a very good accuracy, e.g., +_5 m accuracy, and sometimes with even better accuracy with new technologies. FIG. 3 is a drawing 300 which illustrates typical location mapping of an exemplary UE. Marker 302 indicates an outdoor location of an exemplary UE, which is being tracked, while maker 304 represents an indoor location of the UE. Indoor location can be fairly accurately measured using cellular infrastructure. However, with indoor infrastructure such as WiFi, indoor Distributed Antenna System (DAS) and small network, etc. its possible to determine the indoor location of a UE with greater accuracy. Triangulation and other existing methods can be, and sometimes are, used to measure the location of a UE.

UE location can be, and sometimes is, obtained from multiple sources, e.g., mobile phone tracking, triangulation, indoor DAS, and/or WiFi.

Enterprise WiFi provides a great means of providing accurate indoor location of UEs. This location can be, and sometimes is, reported back to the network via an application such a connection manager. The actual location of the UE within the building is estimated using subscriber information such as apartment and floor, e.g., to determine the height, and geo-data bases to extract actual location, e.g., latitude and longitude coordinates, within the building.

Figure 4:
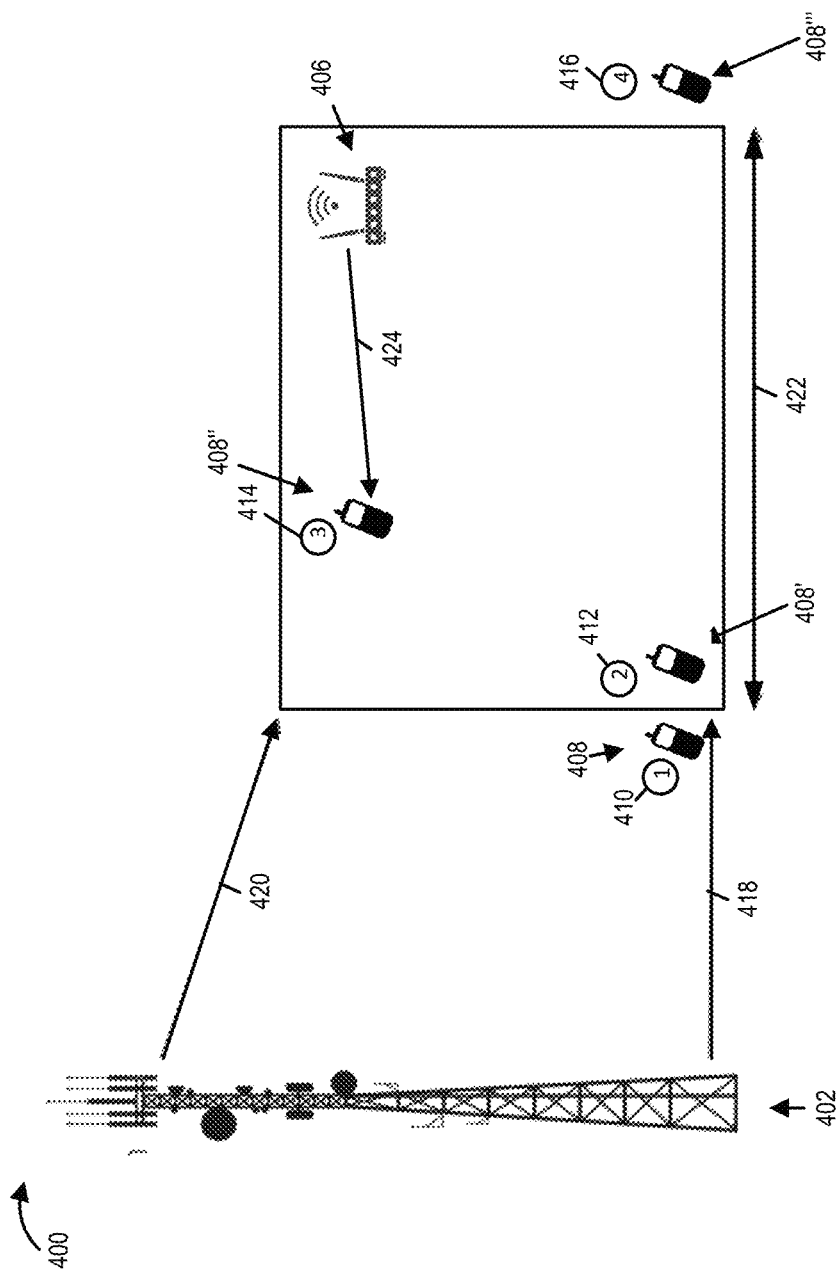
FIG. 4 is a drawing including an exemplary cell tower, e.g., a base station, an exemplary building, an exemplary WiFi access point (AP) located within the building, and an exemplary UE located at four different locations within or near the building, e.g., at different times.

FIG. 4 is a drawing 400 including an exemplary cell tower 402 (e.g., a base station), an exemplary building 404, an exemplary WiFi access point (AP) 406 located within the building 402. Drawing 400 further illustrates an exemplary UE located at four different locations within or near the building, e.g., at different times. The UE starts at location 1 410, which is outside the building 402, and the UE at location 1 410 is indicated as UE 408. The UE moves inside the building to location 2 412, and the UE at location 2 is indicated as UE 408'. The UE moves inside the building to location 3 414, and the UE at location 3 is indicated as UE 408". The UE moves outside to building to location 4 416, and the UE at location 4 416 is indicated as UE 408'''. In the example of FIG. 4, the distance of the tower 402 from the building 404 is known (distance 418 is the distance from the base of the tower 402 to the base of the building 404, distance 420 is the distance from the antenna assembly of the tower 402 to the building 404, and distance 422 is the distance from one side of the building to the other side of the building), and the height of the UE can be determined by consulting stored records and/or databases, e.g., stored information including address of the building, stored information including building dimension information, geo-databases, and stored information including the location of access point within the building. etc. This information is used to calculate the actual distance of the UE 408 from the cell tower (base station) 402 antenna.

A software query will determine which clutter type or building is to be targeted to determine the penetration losses. Depending on the details of penetration losses needed, more than 2 locations are possible as shown in FIG. 4.

For example, location 1 410 and location 2 412 are good locations to determine the front wall losses; location 1410 and location 4 416 are good locations to determine the losses through the building 402; and location 1 and location 3 are good locations to determine the losses midway through the building 402 for more accurate results.

Figure 5:
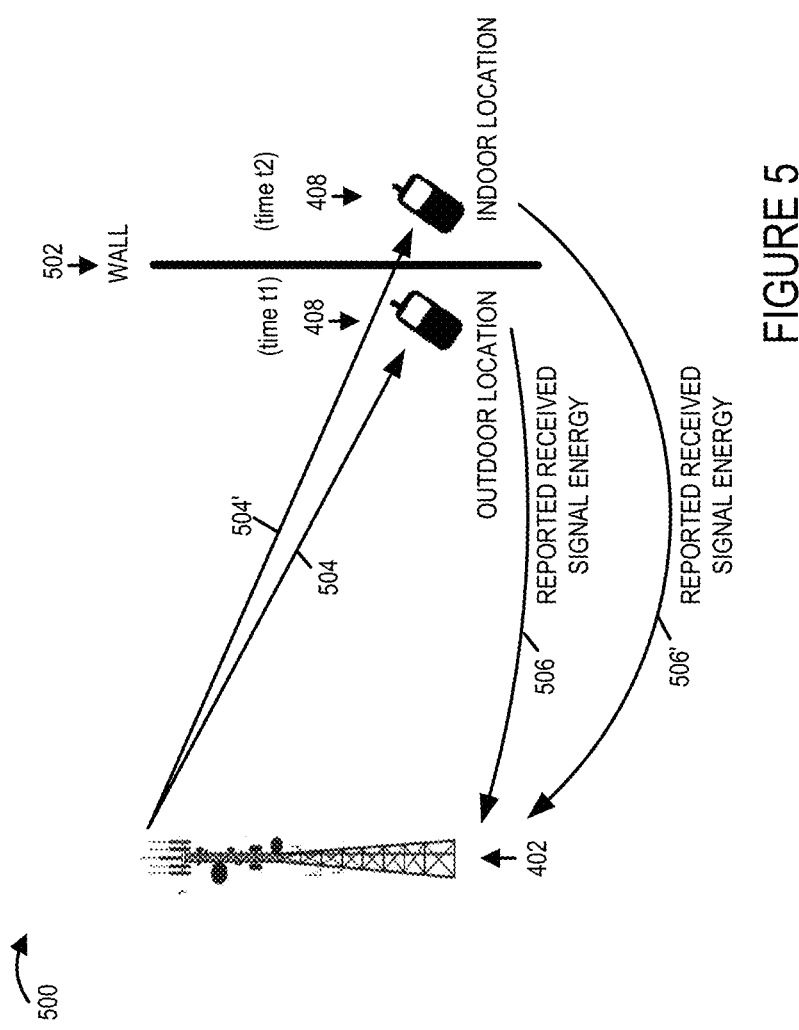
FIG. 5 is a drawing which shows a scenario in which UE reporting of received signal energy measurements from different locations, e.g., an outdoor location and an indoor location, is used as part of a method to determine a loss due to an obstruction, e.g., a wall, in accordance with an exemplary embodiment.

FIG. 5 is a drawing 500 which shows an exemplary scenario in which a UE 408 is receiving signal 504, e.g., a reference signal, from a cell tower base station 502, measuring the signal energy of the received signal, and reporting received signal energy measurement back to the base station 502 via signal 506, while the UE 408 is located outside a building on a first side of wall 502, with an unobstructed line of sight to the base station 502. Then the UE 408 is receiving signal 504', e.g., a reference signal, from the cell tower base station 502, measuring the signal energy of the received signal, and reporting the received signal energy measurements, via signal 506' back to the base station 502, while the UE 408 is located inside the building right behind wall 502.

A wall loss assessment is performed based on the reported received signal energy measurements, knowledge of the base station location, knowledge of the UE locations, and knowledge of the base station transmit power for signals 504, 504'. An application running in the network, e.g., a processing node, coupled to the base station, or within the base station, is used to determine a wall loss value.

In some other embodiments, an application running on UE is used for the purpose of determining the wall loss value. In still other embodiments, an application running on the network side and an application running on the UE side are used in combination for the purpose of determining the wall loss value.

Figure 6:
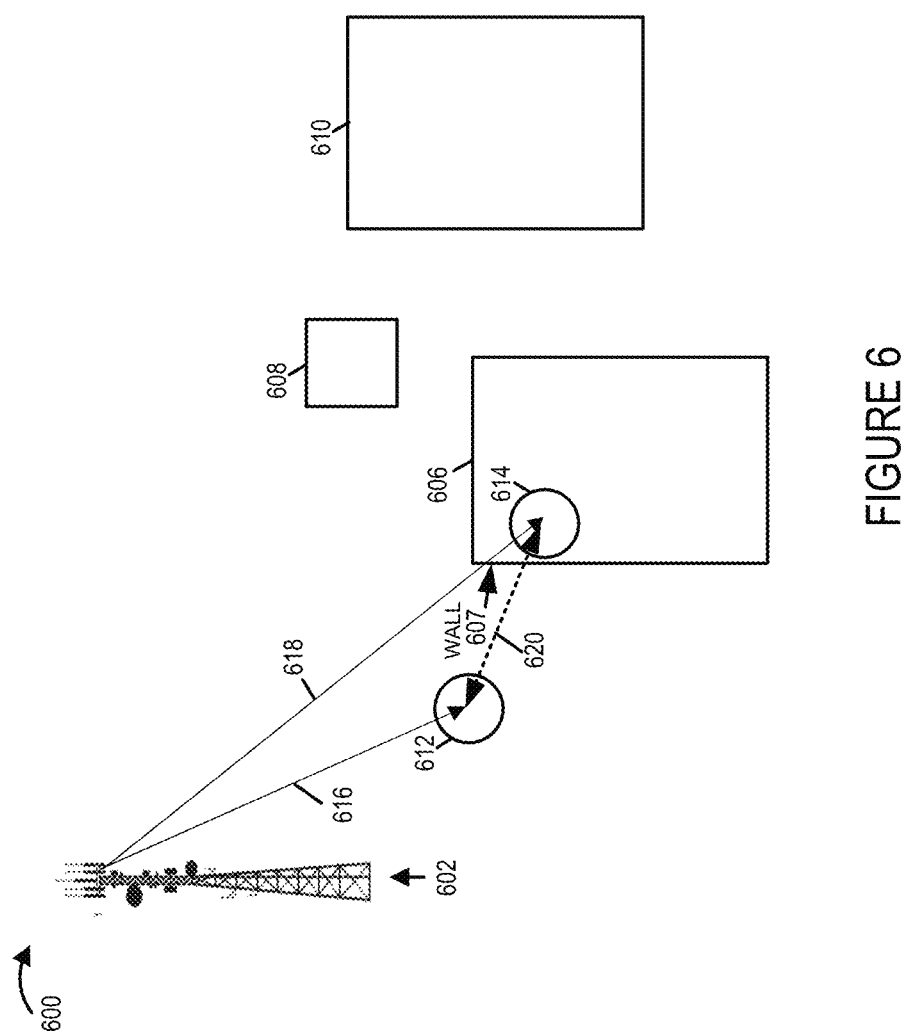
FIG. 6 is a drawing which illustrates exemplary UE location sampling, in accordance with an exemplary embodiment, as part of obtaining a pair of locations, e.g., an indoor and an outdoor location pair, to used to access loss, in accordance with an exemplary embodiment.

FIG. 6 is a drawing 600 which illustrates exemplary indoor UE location sampling. Drawing 600 illustrates an exemplary tower (base station) 602, and exemplary buildings 606, 608 and 610.

For example, a network application, used to access losses, will look for an indoor UE location from a database of indoor vectors. Assume that the network application finds indoor location 614 corresponding to indoor vector 618, which is in a stored database of indoor vectors. The network application, used to access losses, will then look for corresponding outdoor locations for the same UE within a specified distance, for example within a specified distance of 10 m in our case as shown in 6. In this example, consider that the network application finds outdoor location 612 corresponding to outdoor vector 616, wherein the distance 620 is less than 10 meters.

These locations 612, 614 makes a good location pair to find the wall losses for this clutter class. The network application knows, acquires and/or determines the location of the Cell (base station 602) serving the UE, e.g., the exact location of the cell tower 602 and the height of its antenna, the antenna type, the UE which reported received signal measurements and the UE's characteristics, transmit power from the base station, e.g., of reference signal(s) which were measured by the UE, frequency band(s) used, and distances from the transmitter of the base station to the UE, which measured reference signals and reported the results. Some or all of this information is used in assessing the wall loss of the building.

A loss assessment application will, e.g., use and/or take into account: the location of tower, height of the tower antenna, height of the UE, UE type, system gain, and distances, e.g., between the tower transmit antenna, and UE receiver antenna, to evaluate and estimate the penetration loss. Below is a simple equation for a rough estimation of propagation losses. The base station 602 transmits (along vector 616) a first reference signal to the UE, when the UE is located and outdoor location 612. The UE measures the received signal and reports back a signal energy measurement. Note that vector 616 represents an unobstructed line of sight path between base station 602 antenna and the UE at outdoor location 612. A free path space loss can be, and sometimes is, determined based on this measurement. The base station 602 transmits (along vector 618) a second reference signal to the UE, when the UE is located and indoor location 614. The UE measure the received signal and report back a signal energy measurement. Note that vector 618 represents an obstructed line of sight path between base station 602 antenna and the UE at outdoor location 612 because the signal passes through a front wall 607 of building 606.

Wall/penetration loss=Tx power+System gain−Rx power−free space path loss, e.g. where TX power is the base station TX power of the transmitted signal which penetrates the wall, where UE measured received RX power of the received signal at the UE measurement point 614 behind the wall which performs a signal energy measurement, where free space path loss is the path loss through the free space path along the path ending behind the wall, as determined based on the measurement of the signal when the UE is in front of the wall at location 612, and where system gain is an adjustment based on any change in transmit power by the base station from the transmission to the UE when in front of the wall to the transmit power of the transmission to UE when the UE is behind the wall.

In addition to above described approach, in some embodiments, the loss assessment application also knows and uses, e.g., takes into account, the orientation of the UE. i.e., whether its vertical or horizontal to the ground or at an angle. Determining the orientation of the UE will require some pre-work.

The same above described process will be used to calculate losses for other walls of the building.

Figure 7:
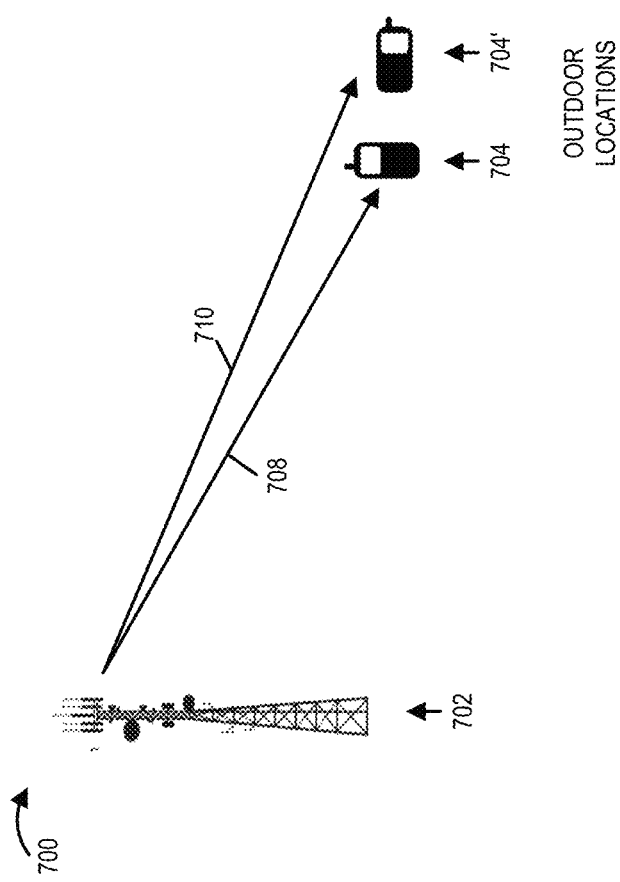
FIG. 7 is a drawing which illustrates an exemplary cell tower (base station) and an exemplary UE, being evaluated in two orientations, vertical and horizontal, to collect information used to identify orientations, e.g., based on antennas typically used and/or typical antenna patterns corresponding to different device orientations.

Orientation of a cell phone, e.g., whether vertical or horizontal, can be, and in some embodiments is, guessed (determined to be a particular orientation) based on stored results corresponding to previously conducted lab test results. By putting the phone in various orientations and conducting measurements in a controlled lab environment or controlled outdoor environment, profiles for different orientations can be determined and stored. FIG. 7 is a drawing 700 which illustrates an exemplary cell tower (base station) 702 and an exemplary UE 704, being evaluated in two orientations, vertical and horizontal, to collect information used to identify orientations, e.g., based on antennas typically used and/or typical antenna patterns corresponding to different device orientations. Base station 702 transmits reference signals 708 to UE 704, in the vertical orientation, and UE reported feedback is used to characterize the vertical orientation. At another time base station 702 transmits reference signals 710 to UE 704 (represented as 704'), in the horizontal orientation, and UE 704 reported feedback is used to characterize the horizontal orientation. UE 704 is at the same or substantially same location, e.g., an outdoor location with a direction line of sight path to the transmit antenna of the base station 702, for both the vertical and horizontal evaluations.

This lab evaluation, in some embodiments, is done on several cell phones, e.g., different manufactures, models, versions, types, etc., that will be sold to the subscribers. Since a UE typically has several antennae, vertical and horizontal, test patterns corresponding to different orientations can be identified and subsequently used to indicate, e.g., with a reasonable degree of probability, as to which antenna is most likely in use.

In addition to the lab testing, there are couple more ways which can be, and in some embodiments are, used to determine the orientation of the UE. One approach is by looking at the application in use. For example, with texting applications, social media application, and other word centered applications, when a text or other word content is being written, the cell phone will typically be in horizontal position. On the other hand, during a call, when voice is being communicated, the phone will typically be in vertical position. Similarly, for steaming applications the phone will typically be oriented at an angle. The data session active at a time can easily be, and in some embodiments is, used to trace which application is in use. Each application is associated with a particular typical expected cell phone orientation, e.g., horizontal, vertical, or angled, (as described above), and the determined application in use and corresponding stored orientation association information, is used to determine the current orientation of the cell phone.

This determined orientation information will be helpful in determining an adjustment factor used when making loss assessment calculations.

Once a calculation has been made, it is applied to the wall type. This is improved overtime with multiple measurements.

Figure 8:
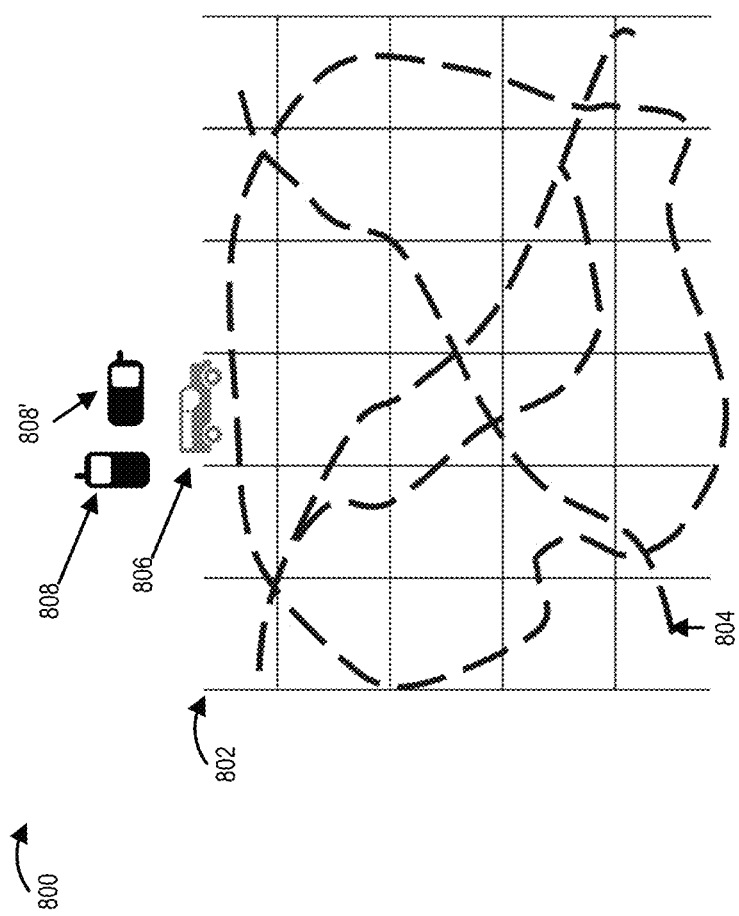
FIG. 8 includes a drawing illustrating an exemplary map with exemplary roads and an exemplary vehicle includes an exemplary cell phone, and baseline data is obtained by conduction of measurements on the same exact drive route, but with the cell phone in two different orientations, said collected baseline data to be subsequently used to predict cell phone orientation.

Another way to assess a mobile's orientation is by conducting a drive test in the city/area these calculations are to be conducted and comparing these measurements. FIG. 8 includes a drawing 800 illustrating an exemplary map 801 with exemplary roads 804, and an exemplary vehicle 806. The vehicle 806 includes an exemplary cell phone, indicated as cell phone 808 when in a vertical orientation and indicated as cell phone 808' when in a horizontal orientation. Baseline data is obtained by conduction measurements on the same exact drive route, but with the cell phone in two different orientations. In this type of testing a vehicle is driven with the cell phone in horizontal orientation and in vertical orientation in a different drive.

A combination of the above described information can be, and some embodiments, is used to determine the orientation of a given UE.

Figure 9:
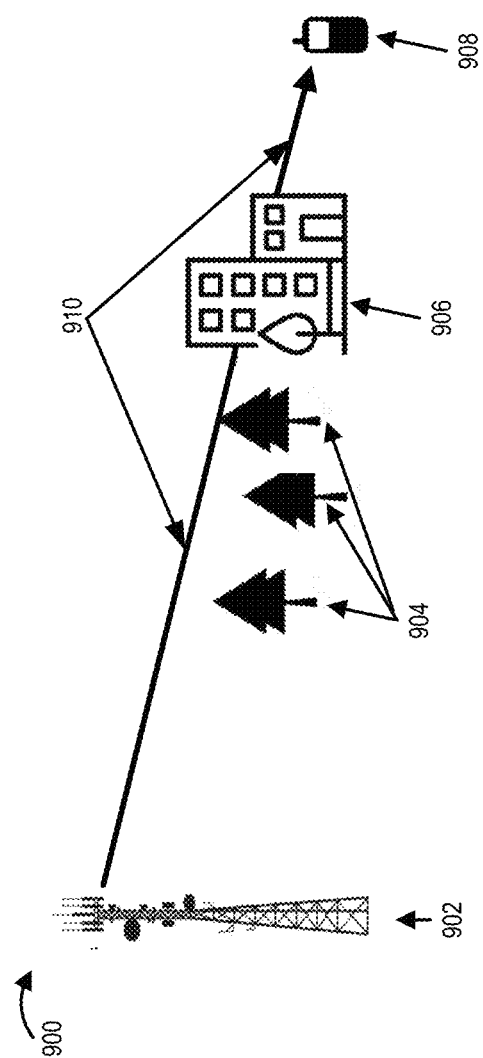
FIG. 9 illustrates an exemplary cell tower (base station) with an antenna, exemplary trees, and exemplary building, and an exemplary UE, for an example in which the losses through the building are determined and assigned, e.g., based on UE reference signal measurements on the near side of the building and UE signal measurement on the far side of the building, as well as determined UE location information, and determined UE orientation information.

Its important that from a given transmission tower, a UE should initially have a direct line of sight with no obstructions to the antenna of the transmission tower. Initially clutter, e.g., due to building and other obstructions does not initially have assigned losses. Losses corresponding to a first building or other first obstruction can be determined and assigned, e.g., based on UE measurements, e.g., outdoor measurements corresponding to the unobstructed side of the building (outdoor near side of the building with a line of sight to the tower antenna) and measurements inside the building and/or outside measurements corresponding to the far side (outdoor far side of the building with an obstructed view to the tower antenna). Drawing 900 of FIG. 9 illustrates an exemplary cell tower (base station 902) with an antenna, exemplary trees 904, exemplary building 906, and exemplary UE 908. Consider that when the UE 908 is on the near side of the building 906 at ground level, the UE 908 has an unobstructed line of sight view to the antenna of the cell tower (base station) 902; however, when the UE 908 is on the far side of the building 906 at ground level, the UE 908 has an obstructed line of sight 910 to the antenna of the cell tower (base station) 902. Thus, the losses through the building 906 are determined and assigned, e.g., based on UE reference signal measurements on the near side of the building and UE signal measurement on the far side of the building, as well as determined UE location information, and determined UE orientation information.

Initially, losses corresponding to buildings or obstructions with a near side unobstructed line of sight to the antenna of the cell tower are determined, e.g., with more and more buildings (which have a clear line of sight to the cell tower) in the environment being evaluated getting losses assigned. Then this building/obstruction loss determination process can be, and sometimes is, extended to more buildings that are shadowed, e.g., by 1, 2 or more buildings.

Figure 10:
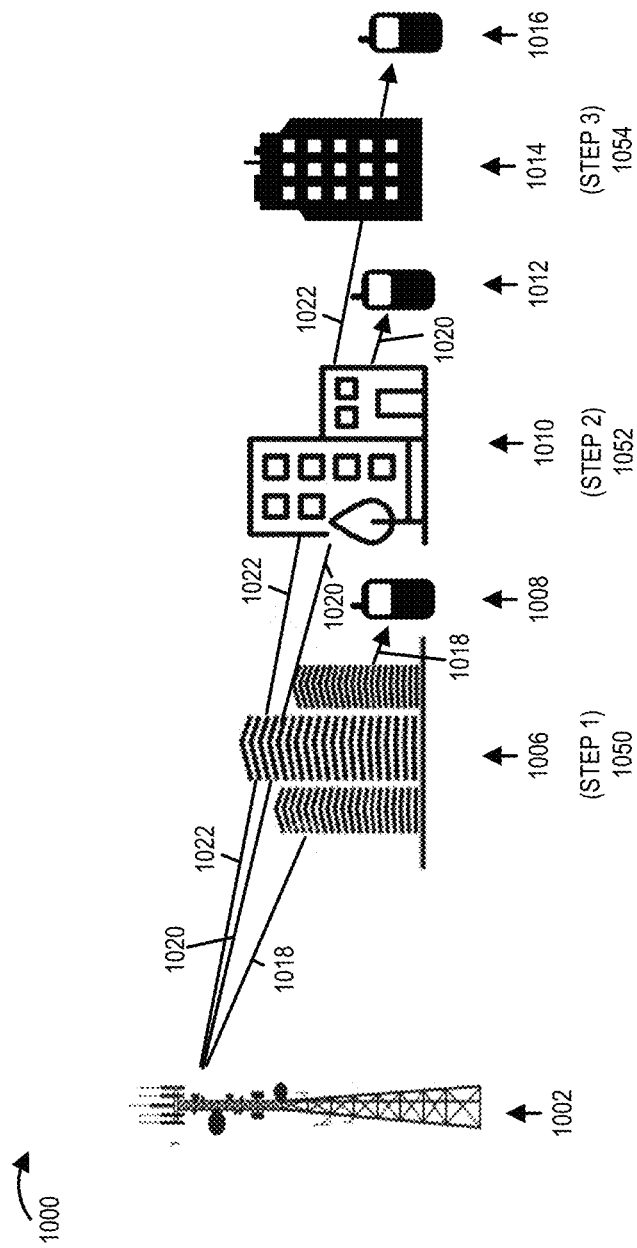
FIG. 10 illustrates an exemplary multi-step, e.g., 3 step, process of loss determinations in which buildings or obstructions correspond to different levels of obstruction.

Drawing 1000 of FIG. 10 illustrates an exemplary multi-step, e.g., 3 step, process of loss determinations in which buildings or obstructions correspond to different levels of obstruction. Drawing 1000 includes a cell tower (base station) 1002, a first building 1006, which has a near side ground level unobstructed line of sight view to the antenna of the cell tower 1002, a second building 1010 which is a first tier shadowed building, e.g. the line of sight view from the near side ground level of the second building 1010 is obstructed by the first building 1006, and a third building 1014, which is a second tier shadowed building, e.g. the line of sight view from the near side ground level of the third building 1014 is obstructed by the first building 1006 and by the second building 1010.

In the first step (1050), the losses for first tier buildings (with an unobstructed line of sight to the antenna of the cell tower) are determined based on UE outside measurements, e.g., both near side and far side outside measurements for each first tier building. Then, in the second step (1052), the losses for the second tier buildings (with an obstructed line of sight including a single obstruction to the antenna of the cell tower) are determined, using the determined first tier building losses, in addition to UE outside measurements, e.g., both near side and far side outside measurements for each second tier buildings. Then, in the third step (1054), the losses for the third tier buildings (with an obstructed line of sight including two obstructions to the antenna of the cell tower) are determined, using the determined first tier building losses and the determined second tier building losses, in addition to UE outside measurements, e.g., both near side and far side outside measurements for each third tier buildings. This approach can be, and in various embodiments, is extended to more than 3 levels.

For example, in first step 1050 the loss for first tier building 1006 is determined. Then in the second step 1052, the loss for second tier building 1010, which shadows building 1006 is determined. Then in third step 1054 the loss of third tier building 1014, which shadows both building 1006 and 1010, is determined.

Arrow 1018 shows a line of sight from the antenna of cell tower base station 1002 to UE 1008, which is located between building 1006 and building 1010. Signals communicated along line of sight 1018 are subjected to losses through building 1006.

Arrow 1020 shows a line of sight from the antenna of cell tower base station 1002 to UE 1012, which is located between building 1010 and building 1012. Signals communicated along line of sight 1020 are subjected to losses through first tier building 1006 and second tier building 1010.

Arrow 1022 shows a line of sight from the antenna of cell tower base station 1002 to UE 1016, which is located on the far side of building 1014 with regard to cell tower 1002. Signals communicated along line of sight 1022 are subjected to losses through first tier building 1006, second tier building 1010, and third tier building 1014.

In some embodiments, a computer program will determine which buildings/clutter to target with concentric circles drawn progressively expanding the circles.

Figure 11:
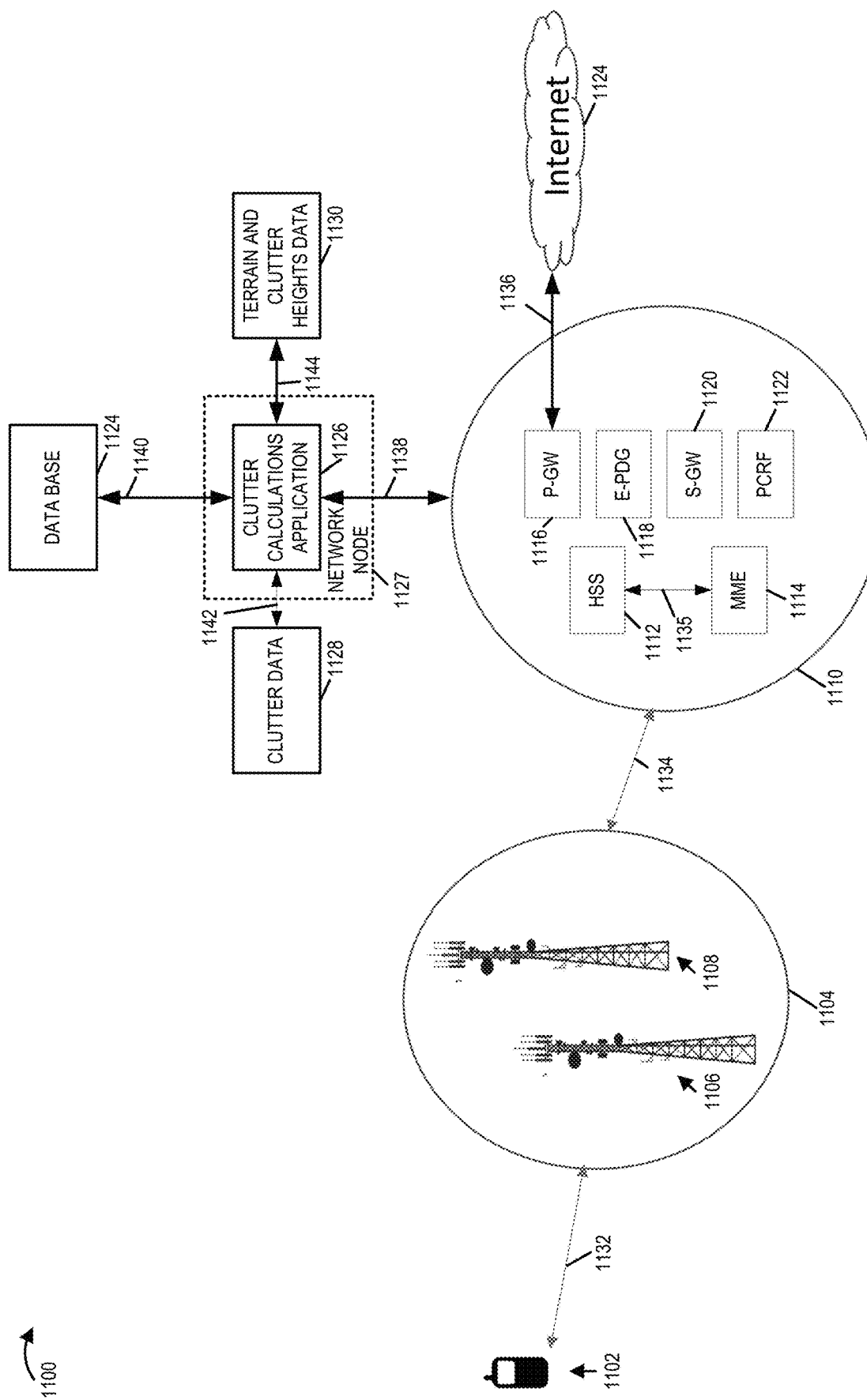
FIG. 11 is a drawing illustrating an exemplary system in which an exemplary method of loss determination may be implemented.

FIG. 11 is a drawing illustrating an exemplary system 1100 in which the exemplary method of loss determination may be implemented. Exemplary system 1100 includes a plurality 1104 of cell towers base stations (cell tower base station 11106, . . . , cell tower base station 1108) a plurality of user equipment (UEs) including exemplary UE 1102, an Evolved Packet Core (EPC) network 1110, Internet 1123, a clutter calculations applications 1126, clutter data 1128, terrain and clutter heights data 1130, and a data base 1124. The EPC network 1110 includes a home subscriber server (HSS) 1112, a Mobility Management Entity (MME) 1114, a Packet Data Network Gateway (P-GW) 1116, an Evolved Packet Date Gateway (E-PDG) 1118, a Serving Gateway (S-GW) 1120, and a Policy and Charging Rules Function (PCRF) 1122.

This mechanism of calculating losses could be, and in some embodiments is, implemented on the network side using an application, e.g., clutter calculations application 1126, sitting on the network side. This application is fairly passive in nature as it does not introduce any active elements into the system or ask for updates from the UE. The application would use existing data from the Evolved Packet Core (EPC) 1110 and make these calculations on its on. The database of vectors/clutter 1128 will be assigned losses and improved over time as more calculations are made. This approach eliminates the need to send labor, e.g., received reference signal measurement survey teams, out to conduct tests around the city and provide very accurate results. In some embodiments, the implementation is on the software, e.g., within an application, e.g., application 1126. In various embodiments, the application 1126 is included as part of network node 1127. The application, e.g., application 1126, will interact with the network to find locations in-building and corresponding outdoor locations. This data will be stored in the database 1124 for future references. The application will interact with terrain and clutter data 1128, 1130 to determine line of sight sites. After making the calculations the application will use a geographic information system (GIS) application to append a loss to a given wall. The calculations will be completed for various frequencies. The process can be enhanced by entering predetermined data from experiments on foliage. This predetermined data from foliage studies can be, and in some embodiments, is used to extend the calculations to buildings that have trees between them. The process above is repeated for other locations i.e., buildings with unassigned losses. Process for 2nd and 3rd tier is repeated with adjustments applied from the first tier buildings' losses.

Figure 12:
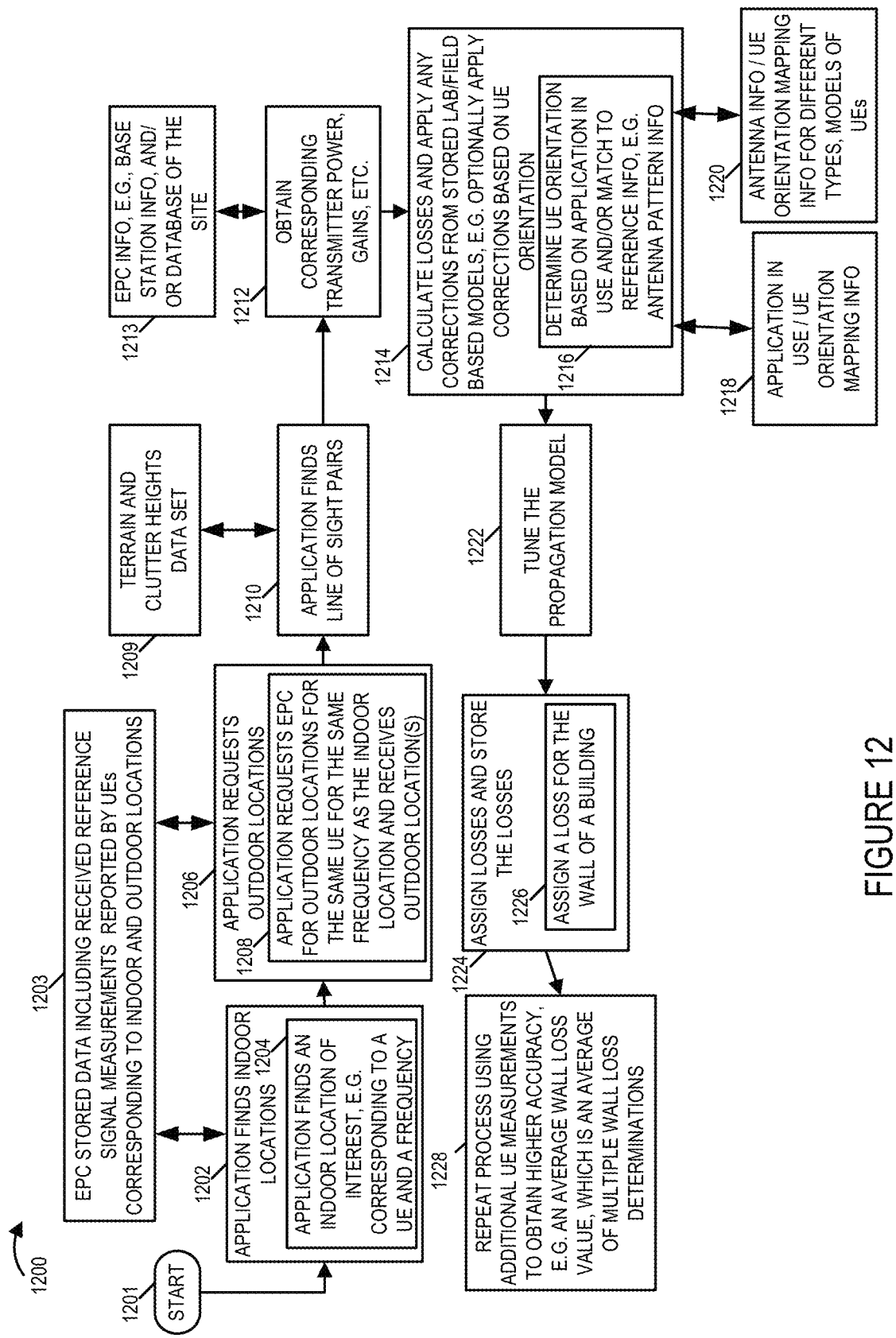
FIG. 12 is a flowchart of an exemplary method of determining losses, e.g., losses for buildings and other obstructions, within a wireless communications environment in accordance with an exemplary embodiment.

FIG. 12 is a flowchart 1200 of an exemplary method of determining losses, e.g., losses for buildings and other obstructions, within a wireless communications environment in accordance with an exemplary embodiment. In some embodiments, the method is implemented by an application, e.g., a loss determination application (sometimes referred to as a clutter calculation application), residing in a device, e.g., a server, which is part of a service provider's communications network. Operation of the exemplary method starts in step 1201 and proceeds to step 1202.

In step 1202, the loss determination application finds indoor locations, e.g., using online vector data information, e.g., data from an existing database(s) 1203 of stored information including received UE signal measurement information, time tags and location information, as well as building geographical mapping information and structure information. Step 1202 includes step 1204 in which the loss determination application finds an indoor location of interest, e.g., corresponding to a UE and a frequency. For example, corresponding to a particular UE and a particular frequency (e.g., frequency band), the application searches a database and finds an indoor location of interest corresponding to the UE for which there is a stored set of information, e.g., including received signal power corresponding to a reference signal sent from a base station, e.g., a cellular tower base station of interest. There is a vector corresponding to the indoor location of the UE, at which the received reference signal was measured, and the antenna of the cell tower base station transmitter which transmitted the received reference signal which was measured by the UE. The data corresponding to indoor location of interest of the UE, e.g., a received signal power level measurement of a reference signal, is to be used in determining losses corresponding to the building, e.g., losses corresponding to an external wall of the building. Operation proceeds from step 1202 to step 1206.

In step 1206 the loss determination application requests outdoor locations from the EPC stored data 1203 and obtains the requested outdoor locations. Step 1206 includes step 1208, in which the loss determination application requests the EPC database 1203 for outdoor locations for the same UE and corresponding to same frequency as the found indoor location of interest from step 1204, and the loss determination application receives the requested outdoor location information from the EPC database 1203 in response to the request. Thus, in step 1208 the loss determination application receives one or more candidate outdoor locations which can be paired with the indoor location of step 1204 to evaluate loss, e.g., through a wall of a building. Operation proceeds from step 1206 to step 1210.

In step 1210 the loss determination application finds one or more line of sight pairs to be used in determining losses due to a building wall or other obstruction, e.g., using the indoor location of interest from step 1204, the received outdoor location(s) of step 1208, and terrain and clutter heights data set 1209 information. For example, the application selects a line of sight vector pair which includes: i) a first line of sight vector from the antenna of the cell tower base station to the indoor location of interest (from step 1204), and ii) a second line of sight vector from the antenna of the cell tower base station to a selected outdoor location from the candidate outdoor locations (of step 1208). For example, the selected outdoor location (from among the candidates of step 1208) for the second line of sight vector is the outdoor location closet to the indoor location (of step 1204), wherein the second line of sight vector represents an unobstructed signal path between the antenna of the cell tower base station and the UE at the selected outdoor location. Operation proceeds from step 1210 to step 1212.

In step 1212, the application obtains, e.g., from stored EPC info 1213, corresponding transmitter (base station transmitter) power information, gain information, path distance information for each vector of the line of sight pair, information about the obstruction, e.g. wall material type, wall thickness information, and other stored information which may be useful in calculating losses. Operation proceeds from step 1212 to step 1214.

In step 1214 the loss determination application calculates losses, e.g., a loss through the wall of a building or a loss through another obstruction, using the stored UE reported measurements, e.g., received reference signal power measurements, corresponding to the indoor location and selected outdoor location for the line of sight pair, in addition to the obtained information, e.g. TX power level, and gain info, obtained in step 1212. In step 1214 the loss determination application may, and sometimes does, also apply any corrections based on stored lab/field based models, e.g. the loss determination application optionally applies corrections based on UE orientation. In some embodiments, step 1214 includes step 1216, in which the loss determination application determines UE orientation for each of the indoor location and outdoor location (of the line of sight pair) based on the type of application (texting type application—horizontal orientation, voice call type application—vertical orientation, or video type application—tilted orientation) in use by the UE during the measurement and/or based on matching measurement related information (e.g., detected antenna pattern information) to reference information, e.g. expected antenna pattern reference information for each different orientation). The operation of step 1216 accesses stored information 1218, 1220, which was determined previously based on lab testing an/or field testing evaluations of different types of UE devices. Operation proceeds from step 1214 to step 1222.

In step 1222 the loss determination application tunes the propagation model based on the calculated losses and applied corrections of step 1214. Operation proceeds from step 1222 to step 1224. In step 1224 the loss determination application assigns losses and stores the losses. Step 1224 includes step 1226 in which the application assigns a loss for a wall of a building. Although the loss through the wall is determined based on measurements corresponding to penetration at particular point of the wall, the wall loss may be, and sometimes is, used for a larger area, e.g., the entire wall, and/or for other similar walls in the same building and/or other similar walls in other buildings. Operation proceeds from step 1224 to step 1128, in which the application repeats the above described process using additional UE measurements, e.g. corresponding to different line of sight pairs to obtain a higher accuracy for the wall loss value, e.g., obtain an average wall loss value based on multiple determinations, e.g., by the same UE and/or by different UEs.

The loss determination process of flowchart 1200 is performed for many different walls, buildings, and/or other obstruction in the environment. The loss determination process of flowchart 1200 is performed for different frequencies which are used by the cell tower base station, e.g., determining different wall loss and/or obstruction loss determination values corresponding to different frequencies.

Figure 13A:
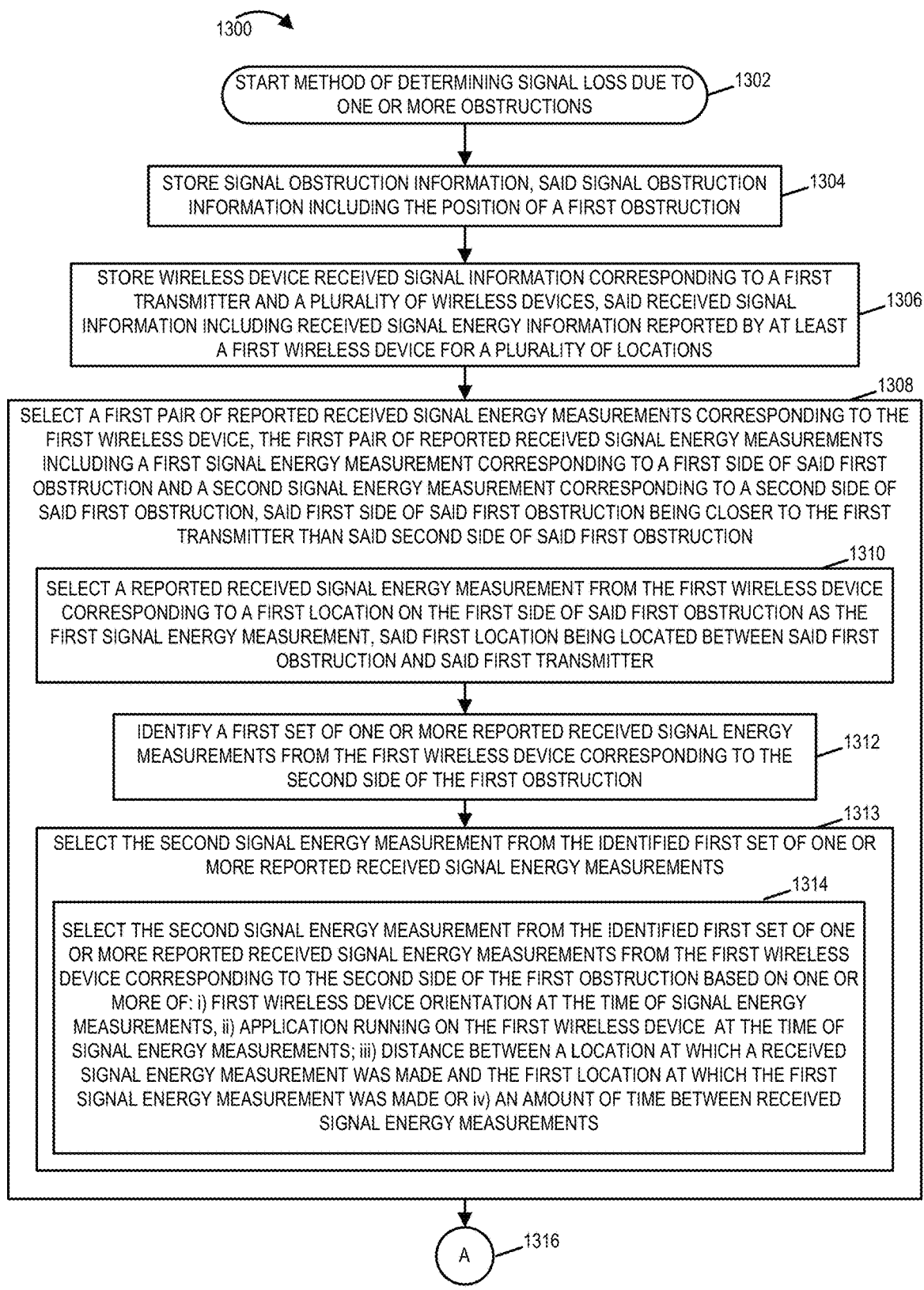
FIG. 13A is a first part of a flowchart of an exemplary method of determining signal loss due to one or more obstructions in accordance with an exemplary embodiment.
Figure 13B:
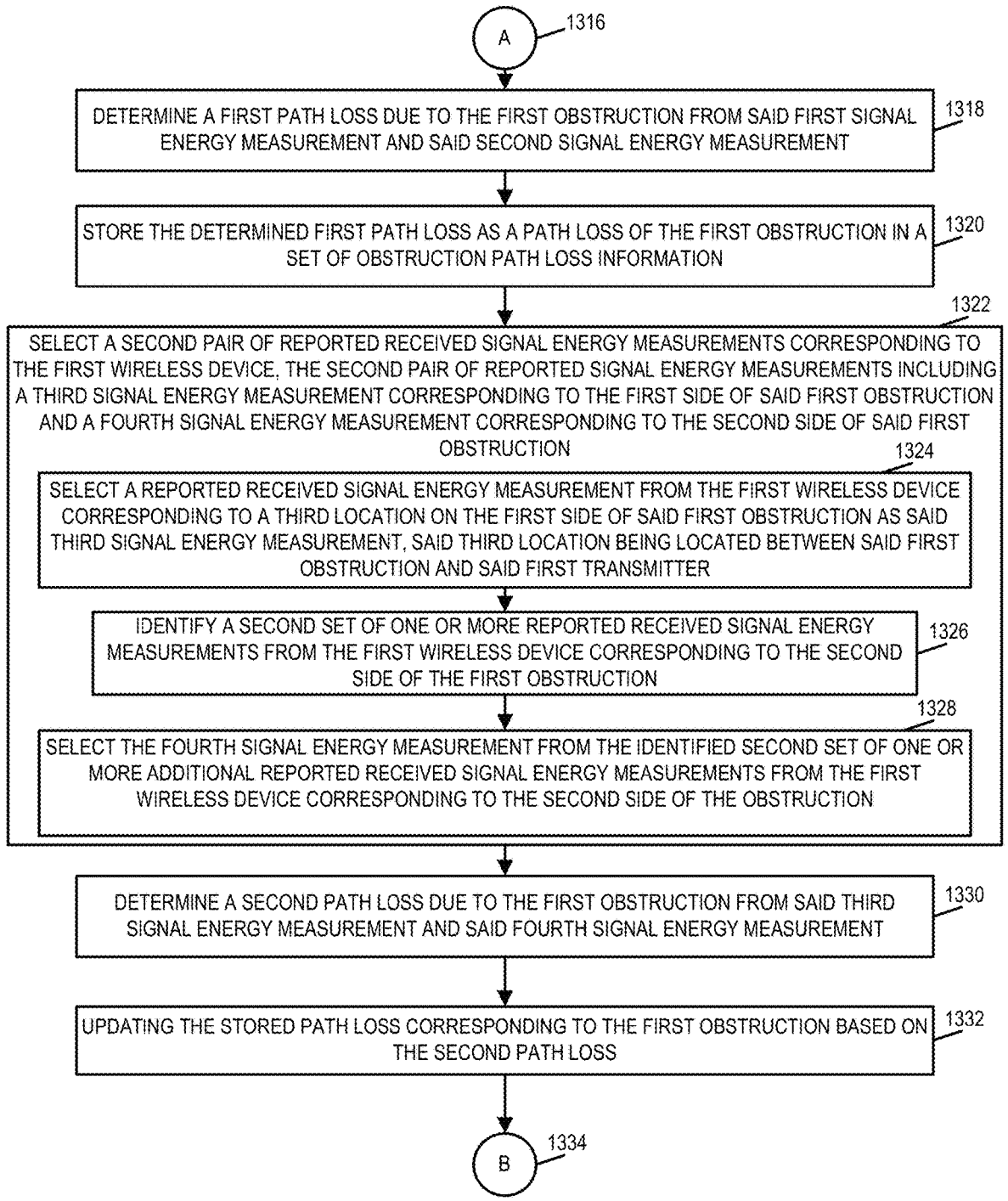
FIG. 13B is a second part of a flowchart of an exemplary method of determining signal loss due to one or more obstructions in accordance with an exemplary embodiment.
Figure 13C:
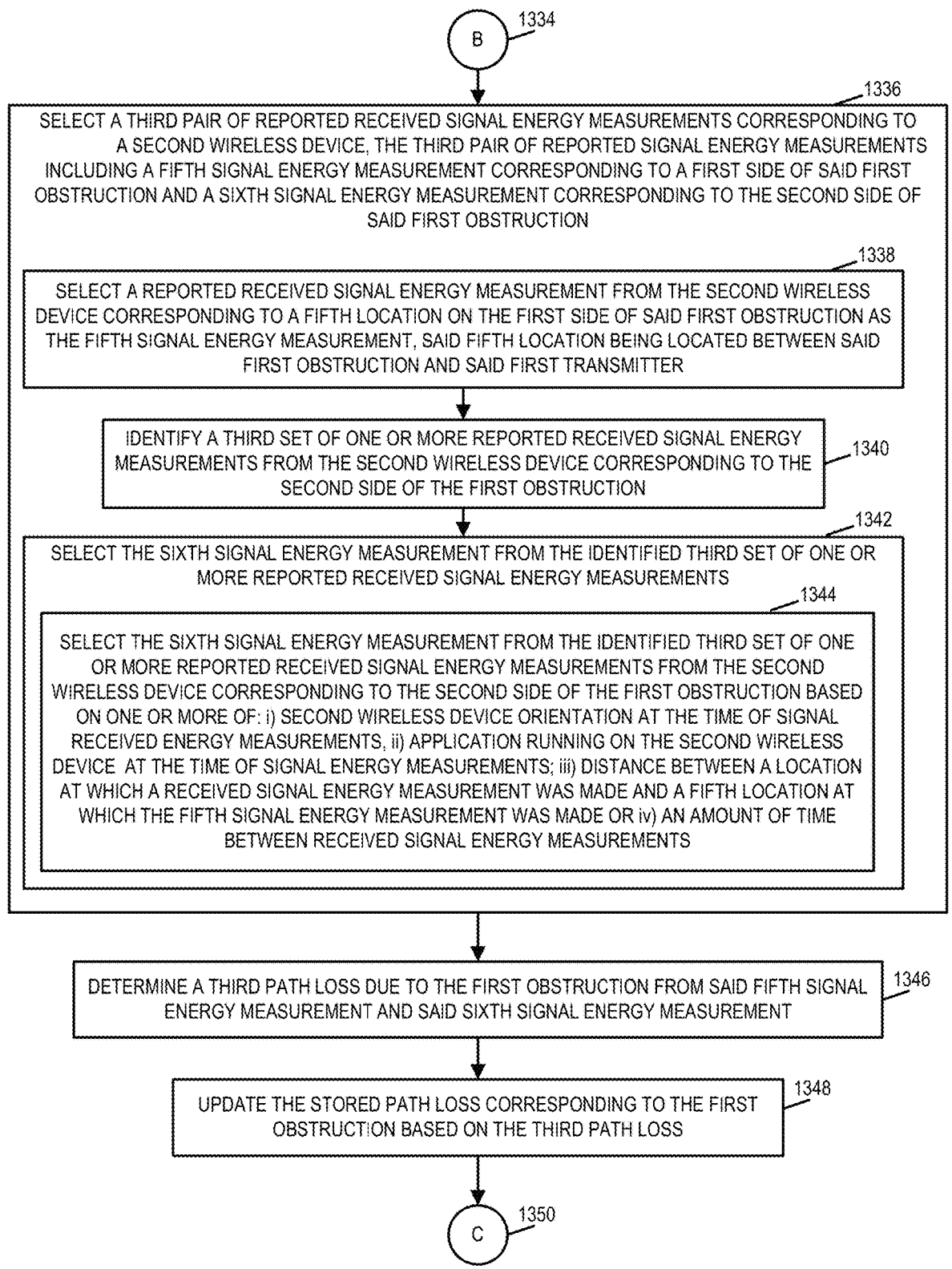
FIG. 13C is a third part of a flowchart of an exemplary method of determining signal loss due to one or more obstructions in accordance with an exemplary embodiment.
Figures 13, 13A, 13B, 13C, 13D:
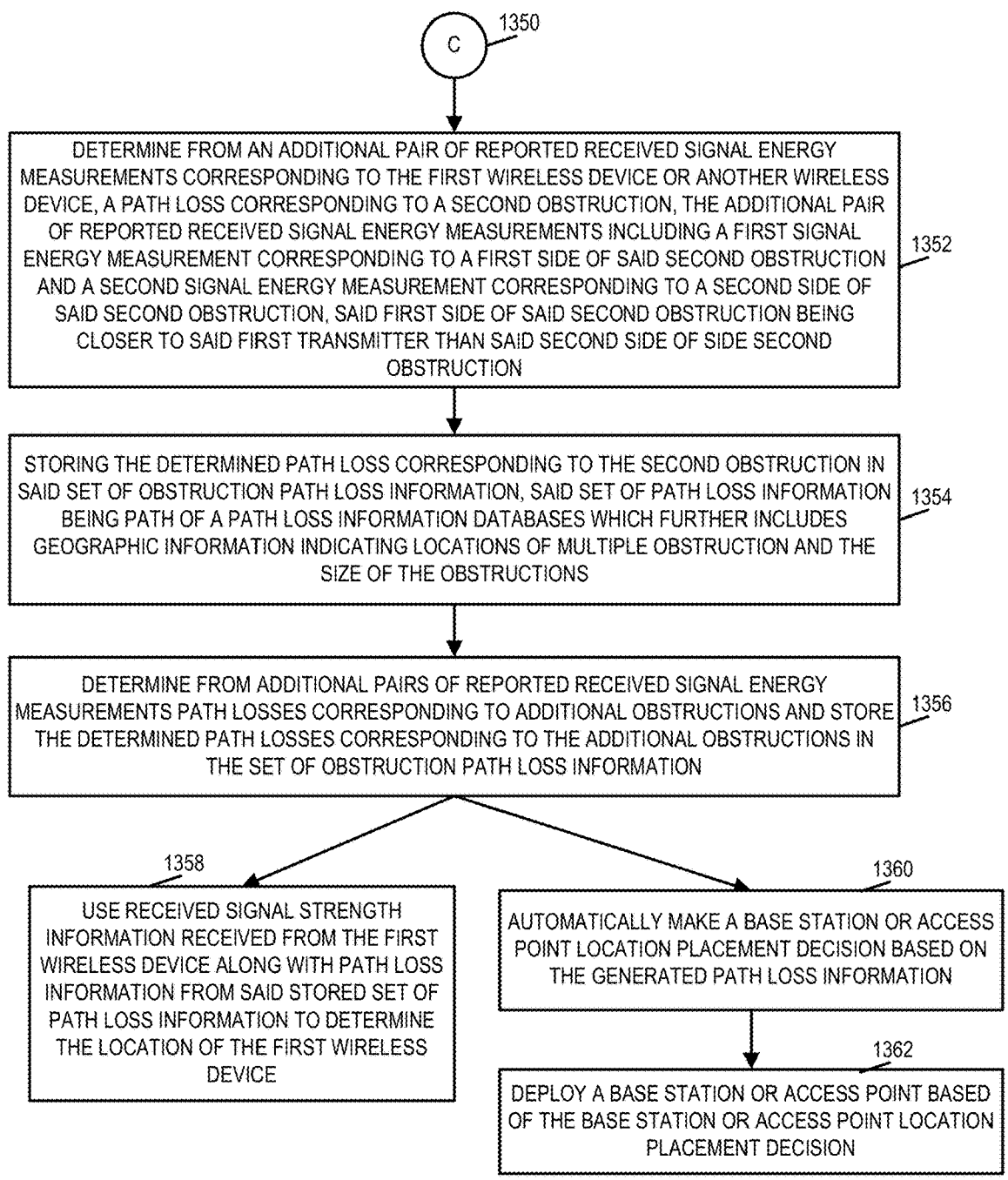
FIG. 13D is a fourth part of a flowchart of an exemplary method of determining signal loss due to one or more obstructions in accordance with an exemplary embodiment.
FIG. 13, comprising the combination of FIG. 13A, FIG. 13B, FIG. 13C and FIG. 13D.

FIG. 13, comprising the combination of FIG. 13A, FIG. 13B, FIG. 13C and FIG. 13D, is a flowchart 1300 of an exemplary method of determining signal loss due to one or more obstructions in accordance with an exemplary embodiment.

Operation starts in step 1302, in which a processing device, e.g., a network node such as a network server including a processor, is powered on an initialized. In some embodiments the processing device is network node 1400 of FIG. 14 or network node 1674 of system 1600 of FIG. 16. Operation proceeds from start step 1302 to step 1304. In step 1304 signal obstruction information including the position, and optionally dimensions, of a first obstruction is stored, e.g., by a network device, e.g., in a database. In some embodiments, the signal obstruction information, which is stored in step 1304 further optionally includes information indicating the type of the first obstruction, e.g., whether the first obstruction is a building, a wall, or other type obstruction. In some embodiments, the position of the first obstruction indicates the location of the first obstruction (e.g., one or more sets of latitude, longitude, and/or altitude information used to define the location of the first obstruction). In some embodiments, the signal obstruction information further indicates whether the location of the first obstruction in an indoor location, a location bordering outdoors/indoors, or an outdoor location. Operation proceeds from step 1304 to step 1306.

In step 1306 wireless device received signal information corresponding to a first transmitter and a plurality of wireless devices is stored, e.g., by one or more network nodes, e.g., an Evolved Packet Core (EPC) network device, in a database. The received signal information includes received signal energy information reported by at least a first wireless device for a plurality of locations and optionally in some cases information indicating the application and/or orientation of the wireless device to which the received signal information corresponds, e.g., the applications in use and/or orientation of the wireless device at the time the wireless device, e.g., user equipment (UE), measured the reported received signal energy. In some cases, an indication if the wireless device was indoors or outdoors when the wireless device measured received signal energy is also included. In some cases, stored data for a measurement includes a measured signal energy value, an identifier of the base station which transmitted the reference signal which was measured, a transmission power level of the transmitted reference signal, an identifier of the wireless device which made the energy measurement, a time tag of the measurements, a location corresponding to the measurement, an application (app) or apps running on the wireless device when the measurement was made, antenna information, e.g. antenna pattern information of the wireless device at the time of measurement, the orientation of the wireless device when the measurement was made, and/or an indication as to whether the wireless device was outdoors or indoors when the measurement was made. Operation proceeds from step 1306 to step 1308.

In step 1308 the processing device selects a first pair of reported received signal energy measurements corresponding to the first wireless device, the first pair of reported received signal energy measurements including a first signal energy measurement corresponding to a first side of said first obstruction and a second signal energy measurement corresponding to a second side of the first obstruction, said first side of said first obstruction being closer to the first transmitter than the second side of said obstruction. Step 1308 includes steps 1310, 1312 and 1314.

In step 1310 the processing device selects a reported received signal energy measurement from the first wireless device corresponding to a first location on the first side of said first obstruction as the first signal energy measurement, said first location being located between the first obstruction and said first transmitter. Operation proceeds from step 1310 to step 1312. In step 1312 the processing device identifies a first set of one or more reported received signal energy measurements from the first wireless device corresponding to the second side of the first obstruction (e.g., where locations corresponding to the second side are locations which have the first obstruction between the location of measurement and the first transmitter). Operation proceeds from step 1312 to step 1313. In step 1313 the processing device selects the second signal energy measurement from the identified first set of one or more reported received signal energy measurements (e.g., the one or more reported received signal energy measurements from the first wireless device corresponding to the second side of the first obstruction).

In some embodiments, the first obstruction is a wall of a first building, and the first signal energy measurement corresponds to a first location which is outside the first building and the second signal energy measurement corresponds to a second location which is inside the first building.

In some embodiments, the first obstruction is a first building, and the first signal energy measurement corresponds to a first location which is outside the first building and the second signal energy measurement corresponds to a second location which is outside the first building.

Step 1313 includes step 1314, in which the processing device selects the second signal energy measurement from the identified first set of one or more reported signal energy measurements from the first wireless device corresponding to the second side of the first obstruction based on one or more or all of: i) first wireless device orientation at the time of the signal energy measurements (e.g., select a reported received signal energy measurement from the first set which corresponds to the same orientation as the first signal measurement), ii) application running on the first wireless device at the time of signal energy measurements (e.g., select a reported received signal energy measurement from the first set which corresponds to the same application that was running when the first signal energy measurement was made), iii) distance between a location at which a received signal energy measurement was made and the first location at which the first signal energy measurement was made (e.g., select the reported received signal energy measurement from the first set which corresponds to the closest distance to a first location at which the first signal energy measurement was made), or iv) an amount of time between received signal energy measurements (e.g., select the reported received signal energy measurement from the first set which corresponds to the closest time to the time at which the first signal energy measurement was made).

In some embodiments, first signal energy measurement corresponds to a signal energy measurement made while the first device is positioned in a first device orientation (e.g., vertical orientation, horizontal orientation or at a first angle relative to the ground); and said step of selecting the second r signal energy measurement from the identified first set of one or more reported received signal energy measurements includes selecting as the second signal energy measurement a signal energy measurement made while the first wireless device is in said first device orientation.

In some embodiments, the first signal energy measurement corresponds to a signal energy measurement made while the first device was running a first application (e.g., word processing or text messaging application); and said step of selecting the second signal energy measurement from the identified first set of one or more reported received signal energy measurements includes selecting as the second signal energy measurement a signal energy measurement made while the first wireless device was running said first application.

In some embodiments, the first signal energy measurement corresponds to the first location; and said step of selecting the second signal energy measurement from the identified first set of one or more reported signal energy measurements includes selecting as the second signal energy measurement an identified reported signal energy measurement within a predetermined distance of the first location to which the first signal energy measurement corresponds (e.g., select the second signal energy measurement from the identified measurements of the first set which is closest to the first signal energy measurement).

In some embodiments, first signal energy measurement corresponds to the first location; and said step of selecting the second signal energy measurement from the identified first set of reported received signal energy measurements includes selecting as the second signal energy measurement the identified reported signal energy measurement from the first set which is closest in time to the time at which the first signal energy measurement was made. Operation proceeds from step 1313, via connecting node A 1316 to step 1318.

In step 1318 the processing device determines a first path loss due to the first obstruction from said first signal energy measurement and said second signal energy measurement. Operation proceeds from step 1318 to step 1320.

In step 1320 the processing device stores the first path loss of the first obstruction in a set of path loss information. Operation proceeds from step 1320 to step 1322.

In step 1322 the processing device selects a second pair of reported received signal energy measurements corresponding to the first wireless device, the second pair of reported received signal energy measurements including a third signal energy measurement corresponding to the first side of said first obstruction and a fourth signal energy measurement corresponding to the second side of the first obstruction. In some such embodiments, the third signal energy measurement corresponds to a third location which is different from the first location at which the first signal energy measurement was made, and the fourth signal energy measurement corresponds to a fourth location which is different from the second location at which the second signal energy measurement was made. Step 1322 includes steps 1324, 1326 and 1328.

In step 1324 the processing device selects a reported received signal energy measurement from the first wireless device corresponding to a third location on the first side of said first obstruction as the third signal energy measurement, said third location being located between the first obstruction and said first transmitter. Operation proceeds from step 1324 to step 1326. In step 1326 the processing device identifies a second set of one or more reported received signal energy measurements from the first wireless device corresponding to the second side of the first obstruction. Operation proceeds from step 1326 to step 1328. In step 1328 the processing device selects the fourth signal energy measurement from the identified second set of one or more reported received signal energy measurements. In some embodiments, in step 1328 the processing device selects the fourth signal energy measurement from the identified second set of one or more reported signal energy measurements from the first wireless device corresponding to the second side of the first obstruction based on one or more or all of: i) first wireless device orientation at the time of the signal energy measurements, ii) application running on the first wireless device at the time of signal energy measurements, iii) distance between a location at which a received signal energy measurement was made and a third location at which the third signal energy measurement was made, or iv) an amount of time between received signal energy measurements. Operation proceeds from step 122 to step 1330.

In step 1330 the processing device determines a second path loss due to the first obstruction from said third signal energy measurement and said fourth signal energy measurement. Operation proceeds from step 1330 to step 1332.

In step 1332 the processing device updates the stored path loss corresponding to the first obstruction based on the second path loss, e.g., replaces the stored path loss corresponding to the first obstruction with an average, e.g., weighted or running average, for the first and second determined path losses. Operation proceeds from step 1332, via connecting node B 1334, to step 1336.

In step 1336 the processing device selects a third pair of reported received signal energy measurements corresponding to the second wireless device, the third pair of reported received signal energy measurements including a fifth signal energy measurement corresponding to the first side of said first obstruction and a sixth signal energy measurement corresponding to the second side of the first obstruction. Step 1336 includes steps 1338, 1340 and 1342.

In step 1338 the processing device selects a reported received signal energy measurement from the second wireless device corresponding to a fifth location on the first side of said first obstruction as the fifth signal energy measurement, said fifth location being located between the first obstruction and said first transmitter. Operation proceeds from step 1338 to step 1340. In step 1340 the processing device identifies a third set of one or more reported received signal energy measurements from the second wireless device corresponding to the second side of the first obstruction. Operation proceeds from step 1340 to step 1342. In step 1342 the processing device selects the sixth signal energy measurement from the identified third set of one or more reported received signal energy measurements. Step 1342 includes step 1344, in which the processing device selects the sixth signal energy measurement from the identified third set of one or more reported signal energy measurements from the second wireless device corresponding to the second side of the first obstruction based on one or more or all of: i) second wireless device orientation at the time of the signal energy measurements (e.g., select a reported received signal energy measurement from the third set which corresponds to the same orientation as the fifth signal measurement, ii) application running on the second wireless device at the time of signal energy measurements (e.g., select a reported received signal energy measurement from the third set which corresponds to the same application that was running when the fifth signal energy measurement was made), iii) distance between a location at which a received signal energy measurement was made and the fifth location at which the fifth signal energy measurement was made (e.g., select the reported received signal energy measurement from the third set which corresponds to the closest distance to a fifth location at which the fifth signal energy measurement was made), or iv) an amount of time between received signal energy measurements (e.g., select the reported received signal energy measurement from the third set which corresponds to the closest time to the time at which the fifth signal energy measurement was made). Operation proceeds from step 1336 to step 1346.

In step 1346 the processing device determines a third path loss due to the first obstruction from said fifth signal energy measurement and said sixth signal energy measurement. Operation proceeds from step 1346 to step 1348.

In step 1348 the processing device updates the stored path loss corresponding to the first obstruction based on the third path loss. Operation proceeds from step 1348, via connecting node C 1350, to step 1352.

In step 1352 the processing device determining from an additional pair of reported received signal energy measurements corresponding to the first wireless device or another device, a path loss corresponding to a second obstruction, the additional pair of reported received signal energy measurement including a first signal energy measurement corresponding to a first side of said second obstruction and a second signal energy measurement corresponding to a second side of said second obstruction, said first side of said second obstruction being closer to said first transmitter than said second side of said second obstruction. Operation proceeds from step 1352 to step 1354.

In step 1354 the processing device stores the determined path loss corresponding to the second obstruction in said set of obstruction path loss information, said set of obstruction path loss information being part of a path loss information database which further includes geographic information indicating locations of multiple obstructions and the size of the obstructions. In some embodiments, said set of information is a three dimensional (3D) obstruction map providing path losses for obstructions included in the 3D obstruction map. Operation proceeds from step 1354 to step 1356.

In step 1356 the processing device determines from additional pairs of reported received signal energy measurements path losses corresponding to additional obstructions and stores the determined path losses corresponding to the additional obstructions in the set of obstruction path loss information. Operation proceeds from step 1356 to step 1358 and 1360.

In step 1358 first wireless device or the processing device or another device, e.g., a network node which determines wireless device location based on reported received signals, uses received signal strength information received from the first wireless device along with path loss information from said stored set of path loss information to determine the location of the first wireless device, e.g., based on triangulation of the first wireless device relative to multiple transmitters, e.g. corresponding to multiple base stations and/or access points, from which the first wireless device reports received signals.

In step 1360, the processing device or another device, e.g., a system management node, automatically makes a base station or access point location placement decision based on the generated path loss information. Operation proceeds from step 1360 to step 1362. In step 1360 the processing device or another device, e.g., a system management node, deploys a base station or access point based on the base station or access point location placement decision, e.g., issues a work authorization directing deployment of said base station or access point and/or directs personnel, e.g., an installation team and material supply facility personnel, e.g., a stock room clerk, to release materials and deploy the base station or access point.

Figure 14:
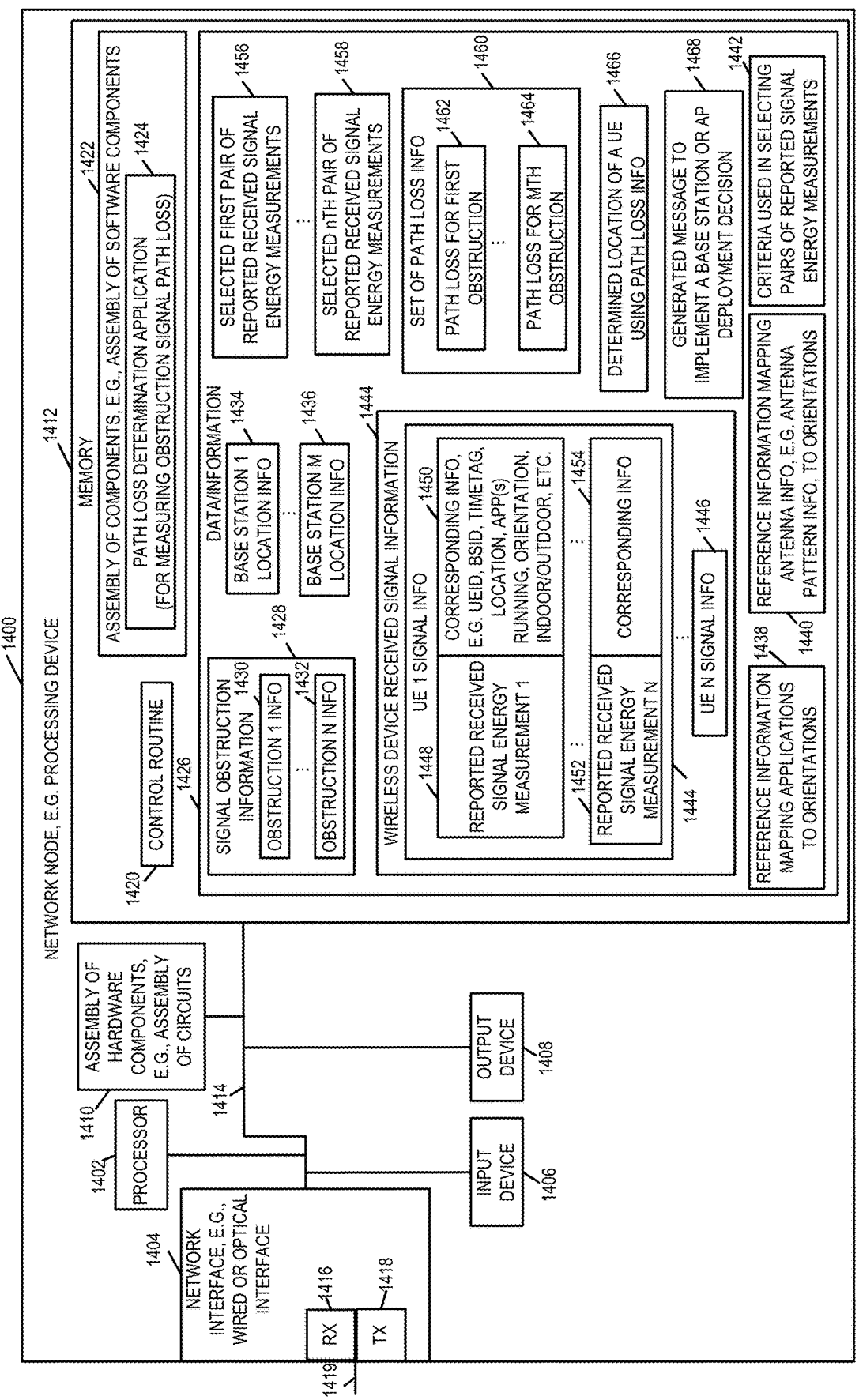
FIG. 14 is a drawing of an exemplary network node, e.g., a processing node, in accordance with an exemplary embodiment.

FIG. 14 is a drawing of an exemplary network node 1400, e.g., a processing node, in accordance with an exemplary embodiment. Exemplary network node 1400 is, e.g., network node 1127 of FIG. 11, a network node implementing steps of the method of flowchart 1200 of FIG. 12, and/or a network node implementing steps of the method of flowchart 1300 of FIG. 13. In some embodiments, network node 1400 is network node 1674 of system 1600 of FIG. 16.

Network node 1400, e.g., a processing node, includes a processor 1402, e.g., a CPU, a network interface 1404, e.g. a wired or optical interface, a input device 1406, e.g., a keyboard, an output device 1408, e.g. a display, an assembly of hardware components 1410, e.g. an assembly of circuits, and memory 1412 coupled together via bus 1414 over which the various elements may interchange data and information. Network interface 1404 includes a receiver 1416, a transmitter 1418, and an output connection 1419, via which the network node 1400 may receive and send signals, messages, and data/information from/to other devices, e.g. other network devices, such as, e.g. base stations, access point, mobility management entities, system deployment nodes, system management nodes, terrain and clutter databases, mobile device location databases, map databases, city buildings and infrastructure databases, mobile device reporting databases including reported received signal energy measurement information, reference signal received power (RSRP) report information, reference signal received quality (RSRP) report information, SNR report information, SINR report information, interference report information, and/or mobile device activity (application usage) tracking information, as well as other databases related to signal propagation, e.g. vector databases for potential wireless signal paths from a base station to coverage locations including path loss information including obstruction path loss information.

Memory 1412 includes a control routine 1420, e.g., for controlling the network node to perform basic function of the network node, e.g., control I/O devices 1406, 1408, load processor 1402 with executable code from memory 1412, etc. Memory 1412 further includes an assembly of software components 1422, e.g., an assembly of software components, e.g., routines, subroutines, applications, etc., and data/information 1426.

The assembly of components 1422, in some embodiments, includes a path loss determination application 1424, for measuring obstruction signal path loss and performing other functions related to path loss. Data/information 1426 includes signal obstruction information 1428 including obstruction information corresponding to a plurality of obstructions in a wireless coverage area corresponding to one or more wireless base stations, e.g., cell tower base station. Signal obstruction information 1430 includes obstruction 1 information 1432 and obstruction N information 1432. An obstruction is, e.g., a wall, a building, a portion of a building, a tree, a water tower, a sign or some other natural or manmade structure or object which can be located in a signal path from a base station to a wireless device, e.g., UE. Obstruction 1 information 1430 includes information specifying the location of obstruction 1, dimensions of obstruction 1 and/or other properties regarding structure one.

Data/information 1426 also includes base station information including location information corresponding to a plurality of base stations (base station 1 location information 1434, . . . , base station M location information 1436). Data/information 1426 further includes wireless device received signal information 1444 corresponding to a plurality of wireless devices (UE 1 signal information 1445, . . . , UE N signal information 1446). UE 1 signal information 1444 includes sets of information corresponding to a plurality of measurements performed by UE 1 (reported received signal energy measurement 11448 and corresponding information 1450, e.g. UE1 ID, base station ID (BSID), a measurement time tag, a location of the measurement, information indication the application (APP) or APPs running on UE 1 at the time of the measurement, a device orientation at the time of the measurement, antenna information, e.g. antenna pattern, at the time of the measurement, information indicating indoors or outdoors at the time of the measurement, etc., . . . , reported received signal energy measurement N 1452 and corresponding information 1454.

Data/information 1426 further includes reference information 1438 mapping application to UE orientation, reference information 1440 mapping antenna information, e.g. antenna pattern information, to UE orientation, and criteria 1442 used in selecting pairs of reported signal measurements, e.g. minimum acceptable distances, minimum acceptable time delays, minimum acceptable levels of uncertainty in determining if an orientation match exists, weighting factors applied to each of a plurality of various selection tests, order of testing, e.g. which test condition takes precedence, etc.

Data information 1426 further includes a plurality of selected pairs of reported signal energy measurements (selected first pair of reported received signal energy measurements 1456, . . . , selected nth pair of received signal energy measurements 1458. In determining a path loss for an obstruction, one of more selected pairs of reported received signal energy measurements are used, each pair of selected reported received signal energy measurements corresponds to a base station and a UE; and the set of one or more selected pairs of reported received signal energy measurements corresponds to one or more UEs.

Data/information 1426 further includes a set of path loss information 1460 including determined path losses corresponding to a plurality of different obstruction (path loss for first obstruction 1462, . . . , path loss for Mth obstruction 1464). In some embodiments data/information 1426 further includes a determined location of UE 1466, which was determined, e.g., by device 1400, using the path loss information from set of path loss information 1460. In some embodiments, data/information 1426 further includes a generated message 1468 to implement a base station or access point (AP) deployment decision, e.g., based on an evaluation of the results of the set of path loss information.

Figure 15A:
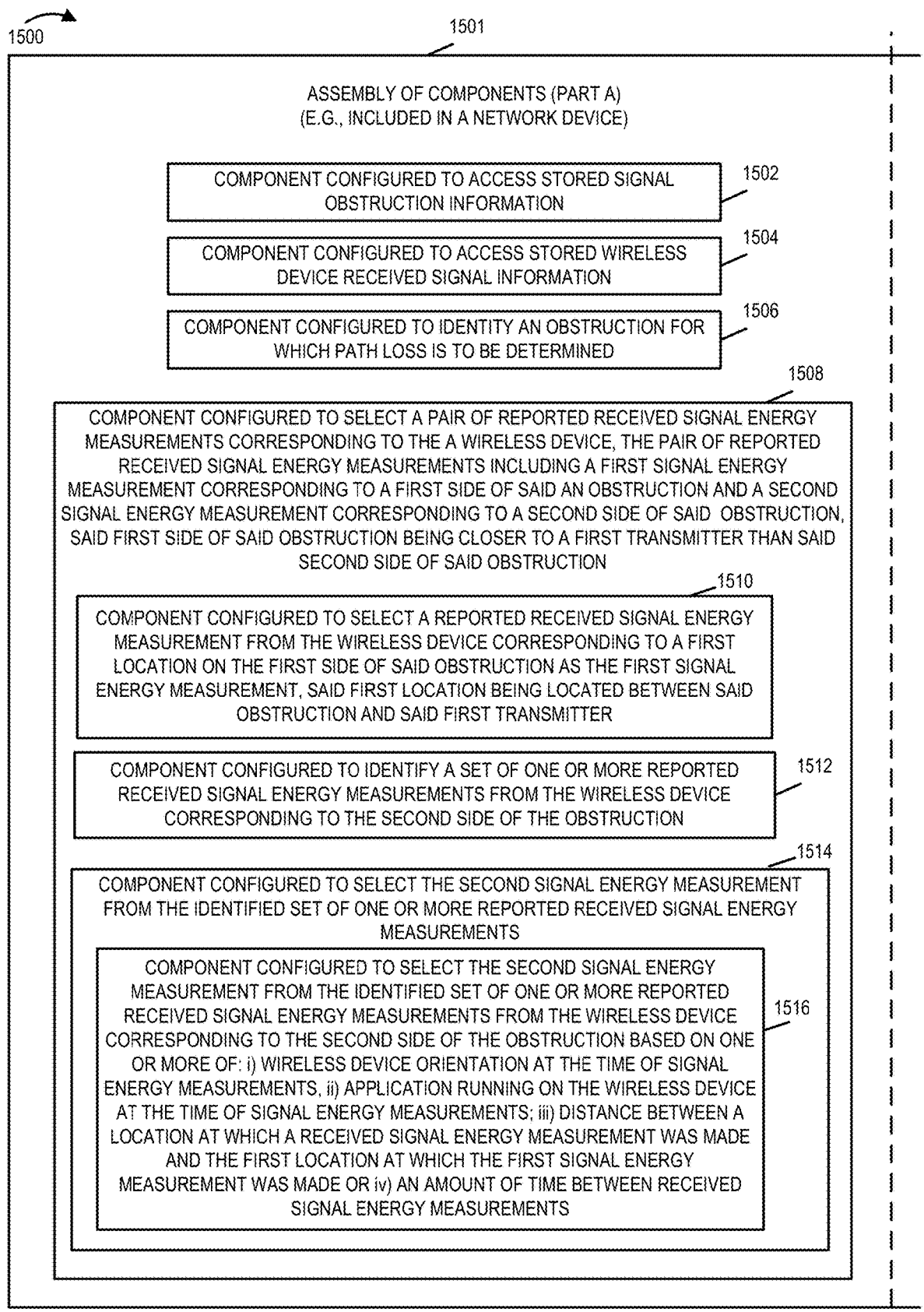
FIG. 15A is a first part of a drawing of an exemplary assembly of components which may be included in a network node, implemented in accordance with an exemplary embodiment.
Figures 15, 15B:
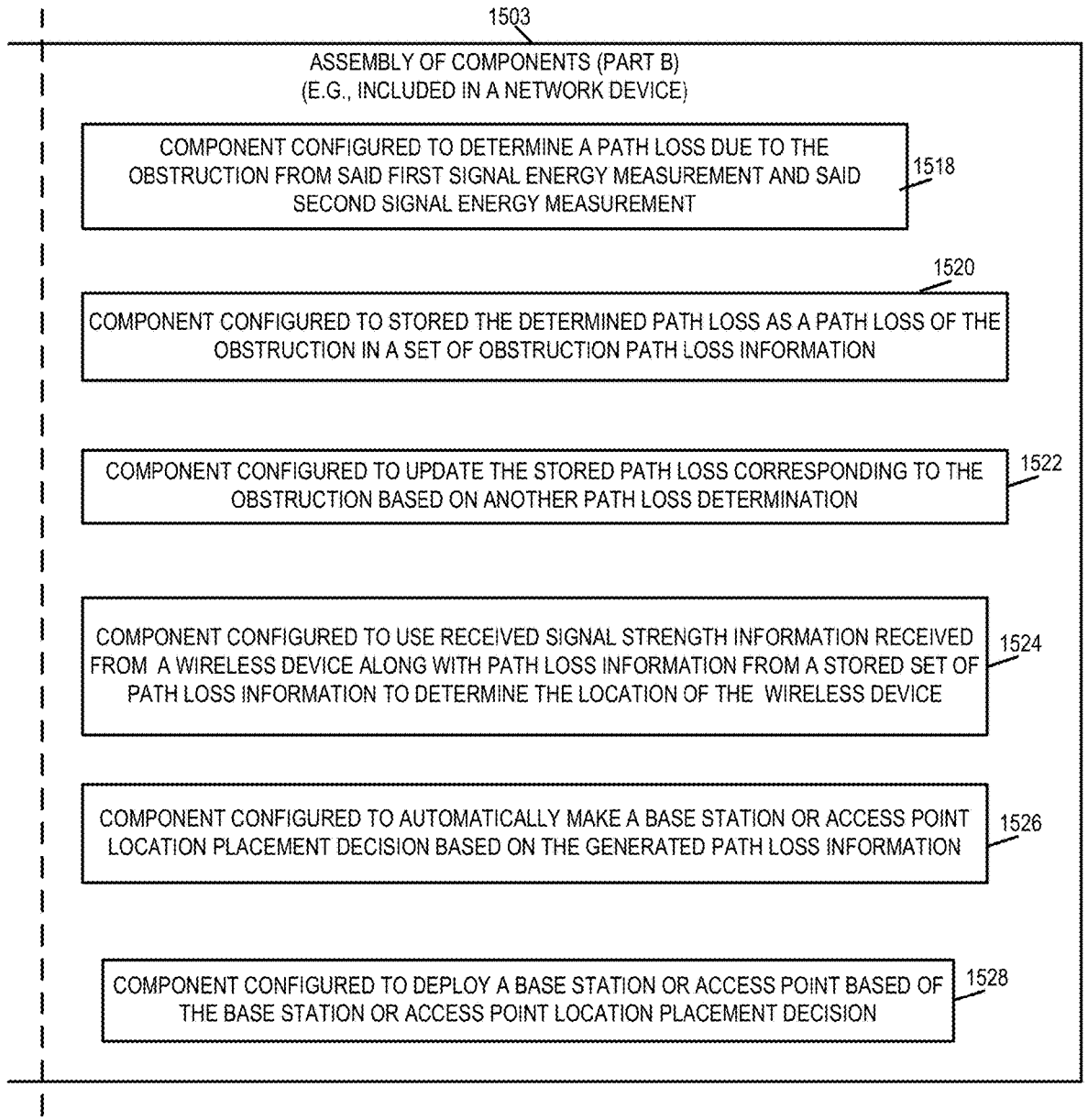
FIG. 15B is a second part of a drawing of an exemplary assembly of components which may be included in a network node, implemented in accordance with an exemplary embodiment.
FIG. 15 comprises the combination of FIG. 15A and FIG. 15B.

FIG. 15, comprising the combination of FIG. 15A and FIG. 15B, is a drawing of an exemplary assembly of components 1500, including Part A 1501 and Part B 1503, which may be included in a network node, e.g., network node 1400 of FIG. 14 implementing steps of the method of flowchart 1200 of FIG. 12 and/or flowchart 1300 of FIG. 13.

The components in the assembly of components 1500 can, and in some embodiments are, implemented fully in hardware within a processor, e.g., processor 1402, e.g., as individual circuits. The components in the assembly of components 1500 can, and in some embodiments are, implemented fully in hardware within the assembly of hardware components 1410, e.g., as individual circuits corresponding to the different components. In other embodiments some of the components are implemented, e.g., as circuits, within processor 1402 with other components being implemented, e.g., as circuits within assembly of components 1410, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1412 of the network node 1400, with the components controlling operation of network node 1400 to implement the functions corresponding to the components when the components are executed by a processor e.g., processor 1402. In some such embodiments, the assembly of components 1500 is included in the memory 1412 as part of an assembly of software components 1422. In still other embodiments, various components in assembly of components 1500 are implemented as a combination of hardware and software, e.g., with another circuit external to the processor providing input to the processor which then under software control operates to perform a portion of a component's function.

When implemented in software the components include code, which when executed by a processor, e.g., processor 1402, configure the processor to implement the function corresponding to the component. In embodiments where the assembly of components 1500 is stored in the memory 1412, the memory 1412 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the network node 1400 or elements therein such as the processor 1402, to perform the functions of corresponding steps illustrated and/or described in the method of one or more of the flowcharts, signaling diagrams and/or described with respect to any of the Figures. Thus, the assembly of components 1500 includes various components that perform functions of corresponding one or more described and/or illustrated steps of an exemplary method, e.g., steps of the method of flowchart 1200 of FIG. 12 and/or steps of the method of flowchart 1300 of FIG. 13.

Assembly of components 1500 includes a component 1502 configured to access stored signal obstruction information 1502, e.g., from one or more databases, a component 1504 configured to access stored wireless device received signal information, e.g., from one or more databases, and a component 1506 configured to identify an obstruction for which path loss is to be determined.

Assembly of components 1500 further includes a component 1508 configured to select a pair of reported received signal energy measurements corresponding to a wireless device, the pair of reported received signal energy measurement including a first signal energy measurement corresponding to a first side of an obstruction and a second signal energy measurement corresponding to a second side of said obstruction, said first side of said obstruction being closer to a first transmitter than said second side of said obstruction. Component 1508 includes a component 1510 configured to select a reported received signal energy measurement from the wireless device corresponding to first location on the first side of said obstruction as the first signal energy measurement, said first location being located between the obstruction and said first transmitter, a component 1512 configured to identify a set of one or more reported received signal energy measurements from the wireless device corresponding to the second side of the obstruction, and a component 1514 configured to select the second signal energy measurement from the identified set of one or more reported received signal energy measurements. Component 1514 includes a component 1512 configured to select the second signal energy measurement from the identified set of one or more reported received signal energy measurements from the wireless device corresponding to the second side of the obstruction based on or more or all of: i) wireless device orientation at the time of signal energy measurements, ii) application(s) running on the wireless device at the time of signal energy measurements, iii) distance between a location at which a signal energy measurement was made and the first location at which the first signal energy measurement was made, or iv) an amount of time between the received signal energy measurements.

Assembly of components 1500 further includes a component 1518 configured to determine a path loss due to the obstruction from the first signal energy measurement and the second signal energy measurement, a component 1520 configured to store the determined path loss as a path loss of the obstruction in a set of path obstruction path loss information, and a component 1522 configured to update the stored path loss corresponding to the obstruction based on another path loss determination.

Assembly of components 1500 further includes a component 1524 configured to used received signal strength information received from a wireless device along with path loss information from a stored set of path loss information to determine the location of the wireless device, a component 1526 configured to automatically make a base station or access point location placement decision based on the generated path loss information and a component 1528 configured to deploy a base station or access point based on the base station or access point location placement decision.

Component 1508 is, e.g., used to implement steps 1308, 1322, and 1336 of the method of flowchart 1300 of FIG. 13. Component 1510 is, e.g., used to implement steps 1310, 1324 and 1338 of the method of flowchart 1300 of FIG. 13. Component 1512 is, e.g., used to implement steps 1312, 1326 and 1340 of the method of flowchart 1300 of FIG. 13. Components 1514 is, e.g., used to implement steps 1313, 1328 and 1342 of the method of flowchart 1300 of FIG. 13. Component 1516 is, e.g., used to implement steps 1314 and 1344 of the method of flowchart 1300 of FIG. 5. Component 1518 is, e.g., used to implement steps 1318, 1330, 1346, 1352, and 1356 of the method of flowchart 1300 of FIG. 13. Component 1520 is, e.g., used to implement steps 1320, 1354 and 1356 of the method of flowchart 1300 of FIG. 13. Component 1522 is, e.g., used to implement steps 1332 and 1348 of the method of flowchart 1300 of FIG. 13. Component 1524 is, e.g., used to implement step 1358 of the method of flowchart 1300 of FIG. 13. Component 1526 is, e.g., used to implement step 1360 of the method of flowchart 1300 of FIG. 13. Component 1528 is, e.g., used to implement step 1362 of the method of flowchart 1300 of FIG. 13.

Figure 16:
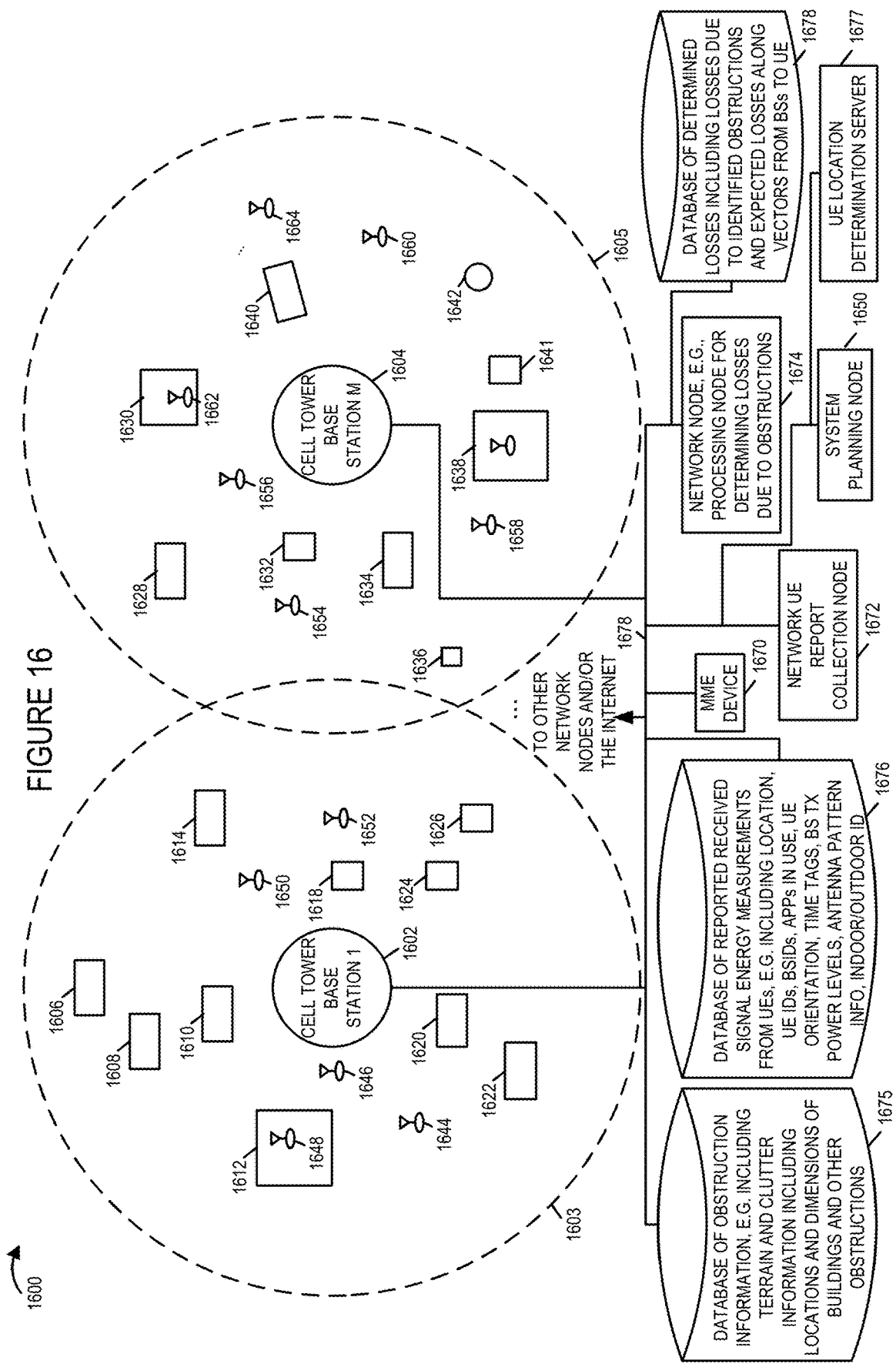
FIG. 16 is a drawing of an exemplary system in accordance with an exemplary embodiment.

FIG. 16 is a drawing of an exemplary communications system 1600 in accordance with an exemplary embodiment. Exemplary communications system 1600 includes a plurality of cell tower base stations (cell tower base station 1 1602, . . . , cell tower base station M 1604), each with a wireless coverage area (1603, 1605), respectively. The system 1600 also includes a plurality of wireless devices, e.g., UEs (wireless device 1 1644, wireless device 2 1646, wireless device 3 1648, wireless device 4 1650, wireless device 5 1652, wireless device 6 1654, wireless device 7 1656, wireless device 8 1660, wireless device 9 1662, . . . , wireless device n 1664). Within the wireless coverage area 1603, there are a plurality of building, objects or other obstructions (1606, 1608, 1610, 1612, 1614, 1618, 1624, 1626). Within the wireless coverage area 1605, there are a plurality of building, objects or other obstructions (1628, 1630, 1632, 1634, 1636, 1638, 1640, 1641, 1642). The wireless devices are mobile devices which may move throughout the system. Thus, at different times a wireless device may be, and generally is, at a different location in the system. At some times a wireless device may be outdoors, while at other times it may be indoors. At some times, a wireless device may have a clear unobstructed line of sight signal path to the base station. However, at other time the same wireless device may have a line of sight signal path to the base station which passes through one or more obstructions, e.g., a wall, a building, another object, or multiple buildings. Each wireless device as it moves throughout the system is receiving reference signals from a base station, measuring the received reference signals and reporting measurements, e.g., received signal energy measurements, etc., back to the base station. The network is collecting and storing the information from the received reports, to be available to be used later. The network is also tracking the location of the UE, the applications being used by the UE, antenna pattern information of the UE, whether the UE in outdoors or indoors, and orientation information of the UE, when available, and storing such information to be available to be used later, e.g., as part of the obstruction loss determination method.

The communications system 1600 further includes a mobility management entity (MME) device, for managing UE handoffs between BSs and performing other mobility management operations, a network UE report collection node 1672 for collecting and storing reported data from the UEs, a network node 1674, e.g. a processing device, for determining losses due to obstructions, a system planning node 1650, e.g., for making and implementing system configuration changes in response to loss determinations, e.g. adding a new base station or new AP to support an area of poor coverage, and a UE location determination server 1677, e.g. to determine the location of a UE, e.g. using determined loss information. In some embodiments network node 1674 is network node 1400 of FIG. 14. The communications system 1600 further includes a database of obstruction information 1675, e.g. including terrain and clutter information including locations and dimensions of buildings and other obstructions, a database 1676 of reported received signal energy measurements from UEs plus additional corresponding information, e.g. including locations, UE IDs, BS IDS, APPs in use, UE orientation information, time tags, base station transmitter power levels, antenna pattern information, and indoor/outdoor tag information, and a database 1678 of determined losses including losses due to identified obstructions and expected losses along vectors from the base stations to UEs. In some embodiments, one or more of the databases (1675, 1676, 1678), are included in a network node. For example, in some embodiments, the database of obstruction information 1675, is included in system planning node 1650, database 1676 of reported received signal energy measurements from UEs plus additional corresponding data is included in network UE report collection node 1672, and database 1678 of determined losses is included in network node 1674, e.g., the loss determination processing node.

NUMBERED LIST OF EXEMPLARY METHOD EMBODIMENTS

Method Embodiment 1. A method of determining signal loss due to one or more obstructions, the method comprising: selecting (1308) a first pair of reported received signal energy measurements corresponding to a first wireless device, the first pair of reported received signal energy measurement including a first signal energy measurement corresponding to a first side of said first obstruction and a second signal energy measurement corresponding to a second side of said first obstruction, said first side of said first obstruction being closer to said first transmitter than said second side of said first obstruction; and determining (1318) a first path loss due to the first obstruction from said first signal measurement and said second signal energy measurements.

Method Embodiment 1A, the method of method embodiment 1 further comprising: storing (1304) signal obstruction information, said signal obstruction information including the position (and optionally dimensions) of the first obstruction (and further optionally including information indicating the type of first obstruction, e.g., whether the obstruction is a building, wall or other obstruction, said position of the first obstruction indicating the location of the first obstruction (e.g., one or more sets of latitude, longitude, and/or altitude information used to define the location of the first obstruction), and in some embodiments, information indicating whether the location is an indoor location (e.g. an interior wall within a building), a location bordering outdoors/indoors (e.g., an exterior wall of a building), or outdoor location (e.g., a tree or water tower or sign or monument or bridge) in some cases).

Method Embodiment 11, the method of method embodiment 1A further comprising: storing (1306) wireless device received signal information corresponding to a first transmitter and a plurality of wireless devices, said received signal information including received signal energy information reported by at least a first wireless device for a plurality of locations (and optionally in some cases information indicating the application and/or orientation of the wireless device when the received signal information corresponds, e.g., the applications and/or orientation of the wireless device at the time the user equipment (UE) measured the reported received signal energy—in some cases data includes an identifier of the base station which transmitted the reference signal which was measured, a transmission power level of the transmitted reference signal, an energy measurement, an identifier of the wireless device which made the energy measurement, a time tag of the energy measurement, a location of the wireless device at the time when the energy measurement was made, an application (app) or apps running on the wireless device when energy measurement was made, antenna pattern information of the wireless device when the energy measurement was made, orientation of wireless device when the energy measurement was made, and/or an indication as to whether the wireless device was indoors or outdoors when the energy measurement was made);

Method Embodiment 1C. The method of Method Embodiment 1B further comprising: storing (1320) the determined first path loss as a path loss of the first obstruction in a set of obstruction path loss information.

Method Embodiment 2. The method of Method Embodiment 1B, wherein selecting (1308) a first pair of reported received signal energy measurements corresponding to the first wireless device includes: selecting (1310) a reported received signal energy measurement from the first wireless device corresponding to a first location on the first side of said first obstruction as said first signal energy measurement, said first location being located between said first obstruction and the first transmitter.

Method Embodiment 2AA. The method of Method Embodiment 2, wherein selecting (1308) a first pair of reported received signal energy measurements corresponding to the first wireless device further includes: identifying (1312) a first set of one or more reported received signal energy measurements from the first wireless device corresponding to the second side of the first obstruction (e.g., where locations corresponding to the second side are locations which have the first obstruction between the location and the first transmitter).

Method Embodiment 2AB. The method of Method Embodiment 2AA, wherein selecting (1308) a first pair of reported received signal energy measurements further includes: selecting (1313) the second signal energy measurement from the identified first set of one or more reported received signal energy measurements (e.g., the one or more reported received signal energy measurements from the first wireless device identified as corresponding to the second side of the first obstruction).

The following Method Embodiments 2AC, AD relate to two exemplary case of interest the first where the obstruction is a wall and the second location inside a building and a second case where an obstruction is a complete building and the two locations are locations outside the building.

Method Embodiment 2AC. The method of Method Embodiment 2AB, wherein the first obstruction is a wall of a first building; and wherein the first signal energy measurement corresponds to a first location which is outside the first building and said second signal energy measurement corresponds to a second location which inside the first building.

Method Embodiment 2AD. The method of Method Embodiment 2AC, wherein the first obstruction is a first building; and wherein the first signal energy measurement corresponds to a first location which is outside the first building and said second signal energy measurement corresponds to a second location which is outside the first building.

One or more of the following Method Embodiments 2A, 2B, 2C, 2D, 2E relate to using different factors for selecting the second energy measurement of the pair such as the orientation of the device at the time the energy measurements are made, the application or applications running on the device at the time the energy measurements are made and/or the distance between the locations with shorter distances being preferred over longer distances since more of the loss will be attributable to the obstruction if the distance is closer to the length of the path through the obstruction than if the distance is far greater and includes losses attributable to other objects or the air.

Method Embodiment 2A. The method of Method Embodiment 2AB, wherein selecting (1313) the second signal energy measurement from the identified first set of one or more reported received signal energy measurements includes: selecting (1314) the second signal energy measurement from the identified first set of one or more reported received signal energy measurements based on one or more of: i) first wireless device orientation at the time of received signal energy measurements (e.g., select a reported received signal energy measurement from the first set which corresponds to the same orientation as the first signal measurement); ii) application running on the first wireless device at the time of received signal energy measurement (select a reported received signal energy measurement from the first set which corresponds to the same application type as the application that was running when the first signal energy measurement was made, different application types being associated with different orientations), iii) distance between a location at which a received signal energy measurement was made and the first location at which the first signal energy measurement was made (e.g., select the reported received signal energy measurement from the first set which corresponds to the closest distance to a first location at which the first signal energy measurement was made) or iv) an amount of time between received signal energy measurements (e.g., select the reported received signal energy measurement from the first set which corresponds to the closest time to the time at which the first signal energy measurement was made).

Method Embodiment 2B. The method of Method Embodiment 2A, wherein the first signal energy measurement corresponds to a signal energy measurement made while the first device is positioned in a first device orientation (e.g., vertical orientation, horizontal orientation or at a first angle relative to the ground); and wherein selecting (1314) the second signal energy measurement from the identified first set of one or more reported received signal energy measurements includes selecting as the second signal energy measurement a signal energy measurement made while the first wireless device is in said first device orientation.

Method Embodiment 2C. The method of Method Embodiment 2A, wherein the first signal energy measurement corresponds to a signal energy measurement made while the first device was running a first application (e.g., word processing or text messaging application); and wherein selecting (1314) the second signal energy measurement from the identified first set of one or more reported received signal energy measurements includes selecting as the second signal energy measurement a signal energy measurement made while the first wireless device was running said first application.

Method Embodiment 2D. The method of any of Method Embodiment 2B or 2C, wherein the first signal energy measurement corresponds to the first location; and wherein selecting (1314) the second signal energy measurement from the identified first set of one or more reported signal energy measurements includes selecting as the second signal energy measurement an identified reported signal energy measurement within a predetermined distance of the first location to which the first signal energy measurement corresponds (e.g., select the second signal energy measurement from the identified measurements of the first set which is closest to the first signal energy measurement).

Method Embodiment 2E. The method of any of Method Embodiment 2B or 2C, wherein the first signal energy measurement corresponds to the first location; and wherein selecting (1314) the second signal energy measurement from the identified first set of reported received signal energy measurements includes selecting as the second signal energy measurement the identified reported signal energy measurement from the first set which is closest in time to the time at which the first signal energy measurement was made.

Method Embodiments 3-4 relate to an embodiment where an update is based on a second pair of measurements made by the same device which made the first measurements.

Method Embodiment 3. The method of Method Embodiment 1AA, further comprising: selecting (1322) a second pair of reported received signal energy measurements corresponding to the first wireless device, the second pair of reported received signal energy measurements including a third signal energy measurement corresponding to the first side of said first obstruction and a fourth signal energy measurement corresponding to the second side of said first obstruction; and determining (1330) a second path loss due to the first obstruction from said third and fourth signal energy measurements; and updating (1332) the stored path loss corresponding to the first obstruction based on the second path loss (e.g., replace the stored path loss corresponding to the first obstruction with an average, e.g., weighted or running average, for the first and second determined path losses).

Method Embodiment 4. The method of Method Embodiment 3, wherein the third signal energy measurement corresponds to a third location which is different from the first location at which the first signal energy measurement was made and the fourth signal energy measurement corresponds to a fourth location which is different from the second location.

Method Embodiment 5, in some embodiments, relates to a case where the update of the previously determined path loss is made based on received signal energy measurement made by another wireless device, e.g., a second wireless device.

Method Embodiment 5. The method of Method Embodiment 3 or Method Embodiment 4, further comprising: selecting (1336) a third pair of reported received signal energy measurements corresponding to a second wireless device, the third pair of reported received signal energy measurements including a fifth signal energy measurement corresponding to the first side of said first obstruction and a sixth signal energy measurement corresponding to the second side of said first obstruction; determining (1346) a third path loss due to the first obstruction from said fifth and sixth signal energy measurements; and updating (1348) the stored path loss corresponding to the first obstruction based on the third path loss (e.g., replace the stored path loss corresponding to the first obstruction with an average, e.g., weighted or running average, for the first and second determined path losses).

Method Embodiment 5A. The method of Method Embodiment 5, wherein selecting (1336) the third pair of reported received signal energy measurements includes: selecting (1344) the sixth signal energy measurement from an identified set of reported received signal energy measurements made by the second wireless device corresponding to the second side of the first obstruction based on one or more of: i) second wireless device orientation at the time of received signal energy measurements (e.g., select a reported received signal energy measurement from the set which corresponds to the same orientation as the fifth signal measurement); ii) application running on the second wireless device at the time of received signal energy measurement (select a reported received signal energy measurement from the set which corresponds to the same application type as the application that was running when the fifth received signal energy measurement was made), iii) distance between a location at which a received signal energy measurement was made and a fifth location at which the fifth signal energy measurement was made (e.g., select the reported received signal energy measurement from the set which corresponds to the closest distance to the fifth location at which the fifth received signal energy measurement was made) or iv) an amount of time between received signal energy measurements (e.g., select the reported received signal energy measurement from the set which corresponds to the closest time to the time at which the fifth signal energy measurement was made).

Method Embodiment 6. The method of Method Embodiment 5, further comprising: determining (1352) from an additional pair of reported received signal energy measurements corresponding to the first wireless device or another device, a path loss corresponding to a second obstruction, the additional pair of reported received signal energy measurement including a first signal energy measurement corresponding to a first side of said second obstruction and a second signal energy measurement corresponding to a second side of said second obstruction, said first side of said second obstruction being closer to said first transmitter than said second side of said second obstruction.

Method Embodiment 7. The method of Method Embodiment 6, further comprising: storing (1354) the determined path loss corresponding to the second obstruction in said set of obstruction path loss information, said set of obstruction path loss information being part of a path loss information database which further includes geographic information indicating locations of multiple obstructions and the size of the obstructions.

Method Embodiment 7A. The method of Method Embodiment 7 wherein said set of information is a three dimensional (3D) obstruction map providing path losses for obstructions included in the 3D obstruction map.

Method Embodiment 8. The method of Method Embodiment 7, further comprising: using (1358) (e.g., in the first wireless device or in a network node which determines device location based on reported received signals) received signal strength information received from the first wireless device along with path loss information from said stored set of path loss information to determine the location of the first wireless device (e.g., based on triangulation of the device relative to multiple transmitters for which the device reports received signals).

Method Embodiment 8A. The method of Method Embodiment 7, further comprising: automatically (1360) making a base station or access point location placement decision based on the generated path loss information; and deploying (1362) a base station or access point based on the base station or access point location placement decision.

NUMBERED SYSTEM EMBODIMENTS

System Embodiment 1. A system comprising: a storage device including stored signal obstruction information, said signal obstruction information including the position (and optionally dimensions) of a first obstruction (and further optionally including information indicating the type of first obstruction, e.g., whether the obstruction is a building, wall or other obstruction, said position of the first obstruction indicating the location of the first obstruction (e.g., one or more sets of latitude, longitude, and/or altitude information used to define the location of the first obstruction), and in some embodiments, information indicating whether the location is an indoor location (e.g. an interior wall within a building), a location bordering outdoors/indoors (e.g., an exterior wall of a building), or outdoor location (e.g., a tree or water tower or sign or monument or bridge) in some cases); and a network node including: a processor configured to: select (1308) a first pair of reported received signal energy measurements corresponding to the first wireless device, the first pair of reported received signal energy measurement including a first signal energy measurement corresponding to a first side of said first obstruction and a second signal energy measurement corresponding to a second side of said first obstruction, said first side of said first obstruction being closer to said first transmitter than said second side of said first obstruction; and determine (1318) a first path loss due to the first obstruction from said first signal measurement and said second signal energy measurements.

System Embodiment 1A. The system of System Embodiment 1 further comprising: stored wireless device received signal information corresponding to a first transmitter and a plurality of wireless devices, said received signal information including received signal energy information reported by at least a first wireless device for a plurality of locations (and optionally in some cases information indicating the application and/or orientation of the wireless device when the received signal information corresponds, e.g., the applications and/or orientation of the wireless device at the time the user equipment (UE) measured the reported received signal energy—in some cases data includes an identifier of the base station which transmitted the reference signal which was measured, a transmission power level of the transmitted reference signal, an energy measurement, an identifier of the wireless device which made the energy measurement, a time tag of the energy measurement, a location of the wireless device at the time when the energy measurement was made, an application (app) or apps running on the wireless device when energy measurement was made, antenna pattern information of the wireless device when the energy measurement was made, orientation of wireless device when the energy measurement was made, and/or an indication as to whether the wireless device was indoors or outdoors when the energy measurement was made).

System Embodiment 1AA. The system of System Embodiment 1A, wherein said processor is further configured to: store (1320) the determined first path loss as a path loss of the first obstruction in a set of obstruction path loss information.

System Embodiment 2. The system of System Embodiment 1, wherein said processor is further configured to: select (1310) a reported received signal energy measurement from the first wireless device corresponding to a first location on the first side of said first obstruction as said first signal energy measurement, said first location being located between said first obstruction and the first transmitter, as part of being configured to selecting (1308) a first pair of reported received signal energy measurements corresponding to the first wireless device includes:

System Embodiment 2AA. The system of System Embodiment 2, wherein said processor is further configured to: identify (1312) a first set of one or more reported received signal energy measurements from the first wireless device corresponding to the second side of the first obstruction (e.g., where locations corresponding to the second side are locations which have the first obstruction between the location and the first transmitter), as part of being configured to select (1308) a first pair of reported received signal energy measurements corresponding to the first wireless device further includes:

System Embodiment 2AB. The system of System Embodiment 2AA, wherein said processor is further configured to: select (1313) the second signal energy measurement from the identified first set of one or more reported received signal energy measurements (e.g., the one or more reported received signal energy measurements from the first wireless device identified as corresponding to the second side of the first obstruction), as part of being configured to select (1308) a first pair of reported received signal energy measurements.

System Embodiment 2AC. The system of System Embodiment 2AB, wherein the first obstruction is a wall of a first building; and wherein the first signal energy measurement corresponds to a first location which is outside the first building and said second signal energy measurement corresponds to a second location which inside the first building.

System Embodiment 2AD. The system of System Embodiment 2AC, wherein the first obstruction is a first building; and wherein the first signal energy measurement corresponds to a first location which is outside the first building and said second signal energy measurement corresponds to a second location which is outside the first building.

System Embodiment 2A. The system of System Embodiment 2AB, wherein said processor is configured to: selecting (1314) the second signal energy measurement from the identified first set of one or more reported received signal energy measurements based on one or more of: i) first wireless device orientation at the time of received signal energy measurements (e.g., select a reported received signal energy measurement from the first set which corresponds to the same orientation as the first signal measurement); ii) application running on the first wireless device at the time of received signal energy measurement (select a reported received signal energy measurement from the first set which corresponds to the same application type as the application that was running when the first signal energy measurement was made, different application types being associated with different orientations), iii) distance between a location at which a received signal energy measurement was made and the first location at which the first signal energy measurement was made (e.g., select the reported received signal energy measurement from the first set which corresponds to the closest distance to a first location at which the first signal energy measurement was made) or iv) an amount of time between received signal energy measurements (e.g., select the reported received signal energy measurement from the first set which corresponds to the closest time to the time at which the first signal energy measurement was made), as part of being configured to select (1313) the second signal energy measurement from the identified first set of one or more reported received signal energy measurements.

System Embodiment 2B. The system of System Embodiment 2A, wherein the first signal energy measurement corresponds to a signal energy measurement made while the first device is positioned in a first device orientation e.g., vertical orientation, horizontal orientation or at a first angle relative to the ground); and wherein said processor is further configured to: select as the second signal energy measurement a signal energy measurement made while the first wireless device is in said first device orientation, as part of being configured to select (1314) the second signal energy measurement from the identified first set of one or more reported received signal energy measurements.

System Embodiment 2C. The system of System Embodiment 2A, wherein the first signal energy measurement corresponds to a signal energy measurement made while the first device was running a first application (e.g., word processing or text messaging application); and wherein said processor is further configured to: select as the second signal energy measurement a signal energy measurement made while the first wireless device was running said first application, as part of being configured to select (1314) the second signal energy measurement from the identified first set of one or more reported received signal energy measurements.

System Embodiment 2D. The system of any of System Embodiment 2B or 2C, wherein the first signal energy measurement corresponds to the first location; and wherein said processor is further configured to: select as the second signal energy measurement an identified reported signal energy measurement within a predetermined distance of the first location to which the first signal energy measurement corresponds (e.g., select the second signal energy measurement from the identified measurements of the first set which is closest to the first signal energy measurement), as part of being configured to select (1314) the second signal energy measurement from the identified first set of one or more reported signal energy measurements.

System Embodiment 2E. The system of any of System Embodiment 2B or 2C, wherein the first signal energy measurement corresponds to the first location; and wherein said processor is further configured to: select as the second signal energy measurement the identified reported signal energy measurement from the first set which is closest in time to the time at which the first signal energy measurement was made, as part of being configured to selecting (1314) the second signal energy measurement from the identified first set of reported received signal energy measurements.

System Embodiment 3. The system of System Embodiment 1AA, wherein said first processor is further configured to: select (1322) a second pair of reported received signal energy measurements corresponding to the first wireless device, the second pair of reported received signal energy measurements including a third signal energy measurement corresponding to the first side of said first obstruction and a fourth signal energy measurement corresponding to the second side of said first obstruction; and determine (1330) a second path loss due to the first obstruction from said third and fourth signal energy measurements; and update (1332) the stored path loss corresponding to the first obstruction based on the second path loss (e.g., replace the stored path loss corresponding to the first obstruction with an average, e.g., weighted or running average, for the first and second determined path losses).

System Embodiment 4. The system of System Embodiment 3, wherein the third signal energy measurement corresponds to a third location which is different from the first location at which the first signal energy measurement was made and the fourth signal energy measurement corresponds to a fourth location which is different from the second location.

System Embodiment 5. The system of System Embodiment 3 or System Embodiment 4, wherein said first processor is further configured to: select (1336) a third pair of reported received signal energy measurements corresponding to a second wireless device, the third pair of reported received signal energy measurements including a fifth signal energy measurement corresponding to the first side of said first obstruction and a sixth signal energy measurement corresponding to the second side of said first obstruction; determine (1346) a third path loss due to the first obstruction from said fifth and sixth signal energy measurements; and update (1348) the stored path loss corresponding to the first obstruction based on the third path loss (e.g., replace the stored path loss corresponding to the first obstruction with an average, e.g., weighted or running average, for the first and second determined path losses).

System Embodiment 5A. The system of System Embodiment 5, wherein said processor is further configured to: select (1344) the sixth signal energy measurement from an identified set of reported received signal energy measurements made by the second wireless device corresponding to the second side of the first obstruction based on one or more of: i) second wireless device orientation at the time of received signal energy measurements (e.g., select a reported received signal energy measurement from the set which corresponds to the same orientation as the fifth signal measurement); ii) application running on the second wireless device at the time of received signal energy measurement (select a reported received signal energy measurement from the set which corresponds to the same application type as the application that was running when the fifth received signal energy measurement was made), iii) distance between a location at which a received signal energy measurement was made and a fifth location at which the fifth signal energy measurement was made (e.g., select the reported received signal energy measurement from the set which corresponds to the closest distance to the fifth location at which the fifth received signal energy measurement was made) or iv) an amount of time between received signal energy measurements (e.g., select the reported received signal energy measurement from the set which corresponds to the closest time to the time at which the fifth signal energy measurement was made), as part of being configured to select (1336) the third pair of reported received signal energy measurements.

System Embodiment 6. The system of System Embodiment 5, wherein said processor is further configured to: determine (1352) from an additional pair of reported received signal energy measurements corresponding to the first wireless device or another device, a path loss corresponding to a second obstruction, the additional pair of reported received signal energy measurement including a first signal energy measurement corresponding to a first side of said second obstruction and a second signal energy measurement corresponding to a second side of said second obstruction, said first side of said second obstruction being closer to said first transmitter than said second side of said second obstruction.

System Embodiment 7. The system of System Embodiment 6, wherein said processor is further configured to: store (1354) the determined path loss corresponding to the second obstruction in said set of obstruction path loss information, said set of obstruction path loss information being part of a path loss information database which further includes geographic information indicating locations of multiple obstructions and the size of the obstructions.

System Embodiment 7A. The system of System Embodiment 7 wherein said set of information is a three dimensional (3D) obstruction map providing path losses for obstructions included in the 3D obstruction map.

System Embodiment 8. The system of System Embodiment 7, further comprising: a device (e.g., said first wireless device or a mobility management network node) including a second processor configured to operate the device to: use (1358) (e.g., in the first wireless device or in a network node which determines device location based on reported received signals) received signal strength information received from the first wireless device along with path loss information from said stored set of path loss information to determine the location of the first wireless device (e.g., based on triangulation of the device relative to multiple transmitters for which the device reports received signals).

System Embodiment 8A. The system of System Embodiment 7, further comprising: a system management node including a second processor configured to: automatically (1360) make a base station or access point location placement decision based on the generated path loss information; and deploy (1362) a base station or access point based on the base station or access point location placement decision.

Numbered List of Non-Transitory
Computer Readable Medium Embodiments:

Non-Transitory Computer Readable Medium Embodiment 1: A non-transitory computer readable medium including machine readable instruction which when executed by a processor of a network node cause the network node to perform the steps of: selecting (1308) a first pair of reported received signal energy measurements corresponding to the first wireless device, the first pair of reported received signal energy measurement including a first signal energy measurement corresponding to a first side of said first obstruction and a second signal energy measurement corresponding to a second side of said first obstruction, said first side of said first obstruction being closer to said first transmitter than said second side of said first obstruction; and determining (1318) a first path loss due to the first obstruction from said first signal measurement and said second signal energy measurements.

Various embodiments are directed to apparatus, e.g., base stations, e.g. CBSDs, cable modems (CMs), cable modem termination systems (CMTS), base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station, e.g. a CBSD, a cable modems (CM), a cable modem termination system (CMTS), a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

While the invention has been described in the context of a cable delivery system which uses a DOCSIS modem and coaxial cable in some embodiments, the methods and apparatus can be used in the context of other cable and modem combinations. In fact, the methods and apparatus can be used with a fiber optic cable and optical modem and/or with other types of cables and modems. Thus it should be appreciated that a base station can use the described methods with a wide range of cable and modem combinations.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station, e.g. CBSD, a cable modems (CM), a cable modem termination system (CMTS), a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a base station, e.g. a CBSD, a cable modems (CM), cable modem termination system (CMTS), a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a base station, e.g. a CBSD, a cable modem (CM), a cable modem termination system (CMTS), a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., e.g., a base station, e.g. CBSD, a cable modem (CM), a cable modem termination systems (CMT), a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station, e.g. CBSD, a cable modem (CM), a cable modem termination system (CMTS), a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of determining signal loss due to one or more obstructions, the method comprising:
selecting a first pair of reported received signal energy measurements corresponding to a first wireless device, the first pair of reported received signal energy measurements including a first signal energy measurement corresponding to a first side of a first obstruction and a second signal energy measurement corresponding to a second side of said first obstruction, said first side of said first obstruction being closer to a first transmitter than said second side of said first obstruction is to said first transmitter; and
determining a first path loss due to the first obstruction from said first signal energy measurement and said second signal energy measurement.

2. The method of claim 1, further comprising:
storing signal obstruction information, said signal obstruction information including the position of the first obstruction.

3. The method of claim 2, further comprising:
storing wireless device received signal information corresponding to the first transmitter and a plurality of wireless devices, said received signal information including received signal energy information reported by at least the first wireless device for a plurality of locations; and
wherein said selecting the first pair of reported received signal energy measurements involves selecting single energy measurements from stored wireless device received signal information.

4. The method of claim 2, further comprising:
storing the determined first path loss as a path loss of the first obstruction in a set of obstruction path loss information.

5. The method of claim 2, wherein selecting a first pair of reported received signal energy measurements corresponding to the first wireless device includes:
selecting a reported received signal energy measurement from the first wireless device corresponding to a first location on the first side of said first obstruction as said first signal energy measurement, said first location being located between said first obstruction and the first transmitter.

6. The method of claim 5, wherein selecting a first pair of reported received signal energy measurements corresponding to the first wireless device further includes:
identifying a first set of one or more reported received signal energy measurements from the first wireless device corresponding to the second side of the first obstruction.

7. The method of claim 6, wherein selecting a first pair of reported received signal energy measurements further includes:
selecting the second signal energy measurement from the identified first set of one or more reported received signal energy measurements.

8. The method of claim 7,
wherein selecting the second signal energy measurement from the identified first set of one or more reported received signal energy measurements includes:
selecting the second signal energy measurement from the identified first set of one or more reported received signal energy measurements based on one or more of: i) first wireless device orientation at the time of received signal energy measurements, ii) application running on the first wireless device at the time of received signal energy measurement, iii) distance between a location at which a received signal energy measurement was made and the first location at which the first signal energy measurement was made or iv) an amount of time between received signal energy measurements.

9. The method of claim 8,
wherein the first signal energy measurement corresponds to a signal energy measurement made while the first wireless device is positioned in a first device orientation; and
wherein selecting the second signal energy measurement from the identified first set of one or more reported received signal energy measurements includes selecting as the second signal energy measurement a signal energy measurement made while the first wireless device is in said first device orientation.

10. The method of claim 8,
wherein the first signal energy measurement corresponds to a signal energy measurement made while the first wireless device was running a first application; and
wherein selecting the second signal energy measurement from the identified first set of one or more reported received signal energy measurements includes selecting as the second signal energy measurement a signal energy measurement made while the first wireless device was running said first application.

11. The method of claim 7,
wherein the first signal energy measurement corresponds to the first location; and
wherein selecting the second signal energy measurement from the identified first set of one or more reported signal energy measurements includes selecting as the second signal energy measurement an identified reported signal energy measurement within a predetermined distance of the first location to which the first signal energy measurement corresponds.

12. The method of claim 7,
wherein the first signal energy measurement corresponds to the first location; and
wherein selecting the second signal energy measurement from the identified first set of reported received signal energy measurements includes selecting as the second signal energy measurement the identified reported signal energy measurement from the first set which is closest in time to the time at which the first signal energy measurement was made.

13. The method of claim 4, further comprising:
selecting a second pair of reported received signal energy measurements corresponding to the first wireless device, the second pair of reported received signal energy measurements including a third signal energy measurement corresponding to the first side of said first obstruction and a fourth signal energy measurement corresponding to the second side of said first obstruction; and
determining a second path loss due to the first obstruction from said third and fourth signal energy measurements; and
updating the stored path loss corresponding to the first obstruction based on the second path loss.

14. A system comprising:
a storage device including stored signal obstruction information, said signal obstruction information including the position of a first obstruction; and a network node including:

a processor configured to:

select a first pair of reported received signal energy measurements corresponding to a first wireless device, the first pair of reported received signal energy measurements including a first signal energy measurement corresponding to a first side of said first obstruction and a second signal energy measurement corresponding to a second side of said first obstruction, said first side of said first obstruction being closer to a first transmitter than said second side of said first obstruction is to said first transmitter; and determine a first path loss due to the first obstruction from said first signal energy measurement and said second signal energy measurement.

15. The system of claim 14, further comprising:

stored wireless device received signal information corresponding to the first transmitter and a plurality of wireless devices, said received signal information including received signal energy information reported by at least a first wireless device for a plurality of locations.

16. The system of claim 14, wherein said processor is further configured to:

select a reported received signal energy measurement from the first wireless device corresponding to a first location on the first side of said first obstruction as said first signal energy measurement, said first location being located between said first obstruction and the first transmitter, as part of being configured to select a first pair of reported received signal energy measurements corresponding to the first wireless device.

17. The system of claim 16, wherein said processor is further configured to:

identify a first set of one or more reported received signal energy measurements from the first wireless device corresponding to the second side of the first obstruction, as part of being configured to select a first pair of reported received signal energy measurements corresponding to the first wireless device.

18. The system of claim 17, wherein said processor is further configured to:

select the second signal energy measurement from the identified first set of one or more reported received signal energy measurements, as part of being configured to select a first pair of reported received signal energy measurements.

19. The system of claim 18, wherein said processor is configured to:

select the second signal energy measurement from the identified first set of one or more reported received signal energy measurements based on one or more of: i) first wireless device orientation at the time of received signal energy measurements, ii) application running on the first wireless device at the time of received signal energy measurement, iii) distance between a location at which a received signal energy measurement was made and the first location at which the first signal energy measurement was made or iv) an amount of time between received signal energy measurements, as part of being configured to select the second signal energy measurement from the identified first set of one or more reported received signal energy measurements.

20. A non-transitory computer readable medium including machine readable instructions, which when executed by a processor of a network node cause the network node to perform the steps of:

selecting a first pair of reported received signal energy measurements corresponding to a first wireless device, the first pair of reported received signal energy measurements including a first signal energy measurement corresponding to a first side of a first obstruction and a second signal energy measurement corresponding to a second side of said first obstruction, said first side of said first obstruction being closer to a first transmitter than said second side of said first obstruction is to said first transmitter; and determining a first path loss due to the first obstruction from said first signal energy measurement and said second signal energy measurement.

* * * * *